US011696255B2

United States Patent
Jung et al.

(10) Patent No.: US 11,696,255 B2
(45) Date of Patent: *Jul. 4, 2023

(54) RECEIVING A PAGING MESSAGE

(71) Applicant: Lenovo (Singapore) Pte. Ltd., New Tech Park (SG)

(72) Inventors: Hyejung Jung, Northbrook, IL (US); Prateek Basu Mallick, Dreieich (DE); Joachim Loehr, Wiesbaden (DE); Vijay Nangia, Woodridge, IL (US); Ravi Kuchibhotla, Chicago, IL (US); Robert Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,610

(22) Filed: Aug. 23, 2021

(65) Prior Publication Data
US 2021/0385790 A1 Dec. 9, 2021

Related U.S. Application Data

(63) Continuation of application No. 16/247,498, filed on Jan. 14, 2019, now Pat. No. 11,102,752.
(Continued)

(51) Int. Cl.
*H04W 68/00* (2009.01)
*H04W 76/28* (2018.01)
(Continued)

(52) U.S. Cl.
CPC ......... *H04W 68/005* (2013.01); *H04W 48/12* (2013.01); *H04W 72/0446* (2013.01);
(Continued)

(58) Field of Classification Search
CPC ... H04W 48/10; H04W 48/12; H04W 68/005; H04W 72/0446; H04W 76/10; H04W 76/11; H04W 76/27; H04W 76/28
See application file for complete search history.

(56) References Cited

U.S. PATENT DOCUMENTS

| 2002/0094827 A1 | 7/2002 | Jou et al. |
| 2017/0303235 A1 | 10/2017 | Deogun et al. |

(Continued)

FOREIGN PATENT DOCUMENTS

WO 2019068224 A1 4/2019

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V2.0.0, Dec. 2017, pp. 1-68.
(Continued)

*Primary Examiner* — Jason E Mattis
*Assistant Examiner* — Bao G Nguyen
(74) *Attorney, Agent, or Firm* — Kunzler Bean & Adamson

(57) ABSTRACT

Apparatuses, methods, and systems are disclosed for transmission of a paging message. One apparatus includes a processor and a transceiver that transmits at least one paging occasion ("PO") configuration in a system information block ("SIB"), where the SIB includes a first quantity of PO configurations. The processor determines a paging frame ("PF") and a PO identity within the PF and selects a PO configuration, where an amount of POs per PF corresponds to the first quantity of PO configurations included in the SIB and where the selected PO configuration is associated with the determined PO identity. The transceiver transmits a PDCCH carrying paging DCI on a particular paging symbol
(Continued)

within a particular paging slot of the determined PF, where the particular paging slot and the particular paging symbol are determined based on the selected PO configuration.

20 Claims, 15 Drawing Sheets

Related U.S. Application Data

(60) Provisional application No. 62/617,175, filed on Jan. 12, 2018.

(51) Int. Cl.
    *H04W 76/11*     (2018.01)
    *H04W 76/27*     (2018.01)
    *H04W 72/0446*     (2023.01)
    *H04W 76/10*     (2018.01)
    *H04W 48/12*     (2009.01)
    *H04W 48/10*     (2009.01)

(52) U.S. Cl.
    CPC ............ *H04W 76/10* (2018.02); *H04W 76/11* (2018.02); *H04W 76/27* (2018.02); *H04W 76/28* (2018.02); *H04W 48/10* (2013.01)

(56) References Cited

U.S. PATENT DOCUMENTS

| | | |
|---|---|---|
| 2017/0331670 A1 | 11/2017 | Parkvall et al. |
| 2018/0026958 A1 | 1/2018 | Liu et al. |
| 2019/0223086 A1 | 7/2019 | Jung et al. |
| 2019/0223145 A1* | 7/2019 | Jung ..................... H04W 76/11 |
| 2020/0092846 A1 | 3/2020 | Deng et al. |

OTHER PUBLICATIONS

3GPP, "3rd Generation Partnership Project; Technical Specification Group Radio Access Network; NR; Physical layer procedures for control (Release 15)" 3GPP TS 38.213 V1.3.0, Dec. 2017, pp. 1-58.

Motorola Mobility Lenovo, "NR paging design", 3GPP RAN WG1 #91, R1-1720921, Nov. 27-Dec. 1, 2017, pp. 1-3.

Catt, "Issues on Paging Occasion Design", 3GPP TSG-RAN WG2 NR Ad hoc 0118, R2-1800152, Jan. 2-26, 2018, pp. 1-5.

RAN2, "Reply LS on Agreement on Paging" 3GPP TSG-RAN WG2 Meeting #102, R2-1809174, May 21-25, 2018, pp. 1-2.

Huawei Hisilicon, "Resource allocation and indication for data channel", 3GPP TSG WG1 Meeting #88bis, R1-1705069, Apr. 3-7, 2017, pp. 1-8.

NTT DOCOMO, Inc. "Remaining issues on bandwidth parts for NR", 3GPP TSG RAN WG1 Meeting 91, R1-1720825, Nov. 27-Dec. 1, 2017, pp. 1-3.

Samsung, "RAN2 consideration for bandwidth part in NR", 3GPP TSG-RAN WG2 NR Ad-hoc #2 Meeting, R2-1706427, Jun. 27-29, 2017, pp. 1-5.

Erisson, "Notification and retrieval of updated SI for a UE in an active DL BWP", 3GPP TSG-RAN WG2 AH#3, Tdoc R2-1800294, Jan. 22-26, 2018, pp. 1-6.

Catt, "Issues on Paging Occasion Design", 3GPP TSG-RAN WG2 Meeting #101 bis R2-1804273, Revision of R2-1801837, Apr. 16-20, 2018, pp. 1-5.

\* cited by examiner

```
paging-SearchSpace ::=              SEQUENCE {
    pagingOccassionList             SEQUENCE(SIZE (1..maxNrofPagingOccasions)) OF
PagingOccasion
    pagingFrameDuration             ENUMERATED {rf1, rf2},
}

PagingOccasion ::=                  SEQUENCE {
    pagingOccasionId                PagingOccasionId,
    groupOffset                     {0, 2, 5, 7} or {0, 2.5, 5, 7.5},
    nrofSearchSpaceSetsPerSlot      {1, 2},
    slotIncrementStep               {0.5, 1, 2},
    startOFDMsymbol                 {0, 1, 2, 3, 4, 5, 6, 7, 8, 9, 10, 11, 12, 13}
    slotOffset                      {0, 1},
}
```

Example: *paging-SearchSpace* information element

FIG. 9

RECEIVING A PAGING MESSAGE

CROSS-REFERENCE TO RELATED APPLICATIONS

This application claims priority to U.S. Provisional Patent Application No. 62/617,715 entitled "SYSTEM INFORMATION DELIVERY IN A WIDEBAND CARRIER" and filed on Jan. 12, 2018 for Hyejung Jung, Prateek Basu Mallick, Joachim Lohr, Vijay Nangia, Ravi Kuchibhotla, and Robert Love, which is incorporated herein by reference. This application also claims priority to U.S. patent application Ser. No. 16/247,498 entitled "RECEIVING A PAGING MESSAGE" and filed on Jan. 14, 2019 for Hyejung Jung, Prateek Basu Mallick, Joachim Loehr, Vijay Nangia, Ravi Kuchibhotla, and Robert Love, which is incorporated herein by reference.

FIELD

The subject matter disclosed herein relates generally to wireless communications and more particularly relates to acquiring system information and/or communicating a paging message, e.g., of system information modification.

BACKGROUND

The following abbreviations are herewith defined, at least some of which are referred to within the following description.

The following abbreviations are herewith defined, at least some of which are referred to within the following description: Third Generation Partnership Project ("3GPP"), Fifth-Generation Core ("5GC"), Access and Mobility Management Function ("AMF"), Access Point Name ("APN"), Access Stratum ("AS"), Bandwidth Adaptation ("BA"), Bandwidth Part ("BWP"), Binary Phase Shift Keying ("BPSK"), Block Error Rate ("BLER"), Carrier Aggregation ("CA"), Cell-Specific Radio Network Temporary Identifier ("C-RNTI"), Clear Channel Assessment ("CCA"), Cyclic Prefix ("CP"), Common Search Space ("C-SS"), Control Element ("CE"), Cyclical Redundancy Check ("CRC"), Channel State Information ("CSI"), Common Search Space ("C-SS"), Data Radio Bearer ("DRB," e.g., carrying user plane data), Demodulation Reference Signal ("DM-RS"), Discontinuous Reception ("DRX"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Evolved Node B ("eNB"), Evolved Packet Core ("EPC"), Evolved UMTS Terrestrial Radio Access Network ("E-UTRAN"), Guard Period ("GP"), General Packet Radio Service ("GPRS"), Global System for Mobile Communications ("GSM"), Hybrid Automatic Repeat Request ("HARQ"), Internet-of-Things ("IoT"), Listen-Before-Talk ("LBT"), Logical Channel ("LCH"), Long Term Evolution ("LTE"), Master Information Block ("MIB"), Medium Access Control ("MAC"), Master Cell Group ("MCG"), Modulation Coding Scheme ("MC S"), Machine Type Communication ("MTC"), Mobility management Entity ("MME"), Multiple Input Multiple Output ("MIMO"), Multi User Shared Access ("MUSA"), Narrowband ("NB"), Next Generation (e.g., 5G) Node-B ("gNB"), Next Generation Radio Access Network ("NG-RAN"), New Radio ("NR", e.g., 5G radio access), New Data Indicator ("NDI"), Non-Orthogonal Multiple Access ("NOMA"), Orthogonal Frequency Division Multiplexing ("OFDM"), Packet Data Convergence Protocol ("PDCP"), Primary Cell ("PCell"), Physical Broadcast Channel ("PBCH"), Packet Data Network ("PDN"), Protocol Data Unit ("PDU"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Control ("RLC"), Radio Resource Control ("RRC"), Random-Access Procedure ("RACH"), Radio Network Temporary Identifier ("RNTI"), Reference Signal ("RS"), Reference Signal Received Power ("RSRP"), Remaining Minimum System Information ("RMSI"), Resource Block Assignment ("RBA"), Round Trip Time ("RTT"), Receive ("RX"), Signaling Radio Bearer ("SRB," e.g., carrying control plane data), Single Carrier Frequency Division Multiple Access ("SC-FDMA"), Secondary Cell ("SCell"), Secondary Cell Group ("SCG"), Shared Channel ("SCH"), Signal-to-Interference-Plus-Noise Ratio ("SINR"), Service Data Unit ("SDU"), Sequence Number ("SN"), Session Management Function ("SMF"), System Information ("SI"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("the UE"), Uplink ("UL"), User Plane ("UP"), Universal Mobile Telecommunications System ("UMTS"), Uplink Pilot Time Slot ("UpPTS"), Wireless Local Area Network ("WLAN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In mobile communication networks, a bandwidth part ("BWP") consisting of a group of contiguous physical resource blocks ("PRBs") is used in 3GPP New Radio ("NR") to support at least: reduced user equipment ("UE") bandwidth ("BW") capability, UE BW adaptation, frequency division multiplexing ("FDM") of multiple numerologies (e.g., subcarrier spacings), and use of non-contiguous spectrum. A connected mode UE may be configured, e.g., UE-specifically and semi-statically, with a single or multiple active BWP(s) for a single carrier. The bandwidth of a BWP is smaller than or equal to the maximum UE bandwidth capability. However, the bandwidth of a BWP is at least as large as a bandwidth of a SS/PBCH block (e.g., a synchronization signal/physical broadcast channel block), wherein the SS/PBCH block contains primary and secondary synchronization signals and PBCH.

BRIEF SUMMARY

Methods for acquiring system information and/or communicating a paging message are disclosed. Apparatuses and systems also perform the functions of the methods. The methods may also be embodied in one or more computer program products comprising executable code.

One method of a network node for transmission of a paging message includes transmitting at least one paging occasion configuration in a system information block ("SIB"), where the SIB includes a first quantity of paging occasion configurations. The method includes determining a paging frame and a paging occasion identity within a paging frame based on at least one of: a User Equipment ("UE") identity of a device to be paged and a discontinuous reception cycle length, where an amount of paging occasions per paging frame corresponds to the first quantity of paging occasion configurations included in the SIB. The method includes selecting a paging occasion configuration from the transmitted at least one paging occasion configuration, where the selected paging occasion configuration is associated with the determined paging occasion identity. The method includes transmitting a physical downlink control channel ("PDCCH") carrying paging downlink control information ("DCI") on a particular paging symbol within a particular paging slot of the determined paging frame, where the particular paging slot and the particular paging symbol within the particular paging slot are determined based on the selected paging occasion configuration.

One method for receiving a paging message includes receiving one or more paging occasion configurations in a SIB and determining a paging frame and a paging occasion identity within the paging frame based on at least one of: a UE identity and a discontinuous reception ("DRX") cycle length. The method includes selecting a paging occasion configuration from the received one or more paging occasion configurations. Here, the selected paging occasion configuration is associated with the determined paging occasion identity. The method also includes determining a paging slot and a paging symbol within the determined paging slot based on the selected paging occasion configuration. The method also includes decoding a PDCCH carrying paging DCI on the determined paging symbol within the determined paging slot of the determined paging frame.

One method for SI delivery in a wideband carrier includes acquiring a system information block ("SIB") for a first cell in an initial active DL BWP and establishing a RRC connection with the first cell based on the acquired SIB. The method includes transmitting an indication of one or more SIBS necessary for UE operation to a network entity and switching to a first DL BWP. Here, the first DL BWP is different from the initial active DL BWP. Also, the indication of the one or more SIBS necessary for remote unit operation may be transmitted via higher layer signaling.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a diagram illustrating one embodiment of paging-SearchSpace information element used for receiving a paging message;

DETAILED DESCRIPTION

Figure 1:
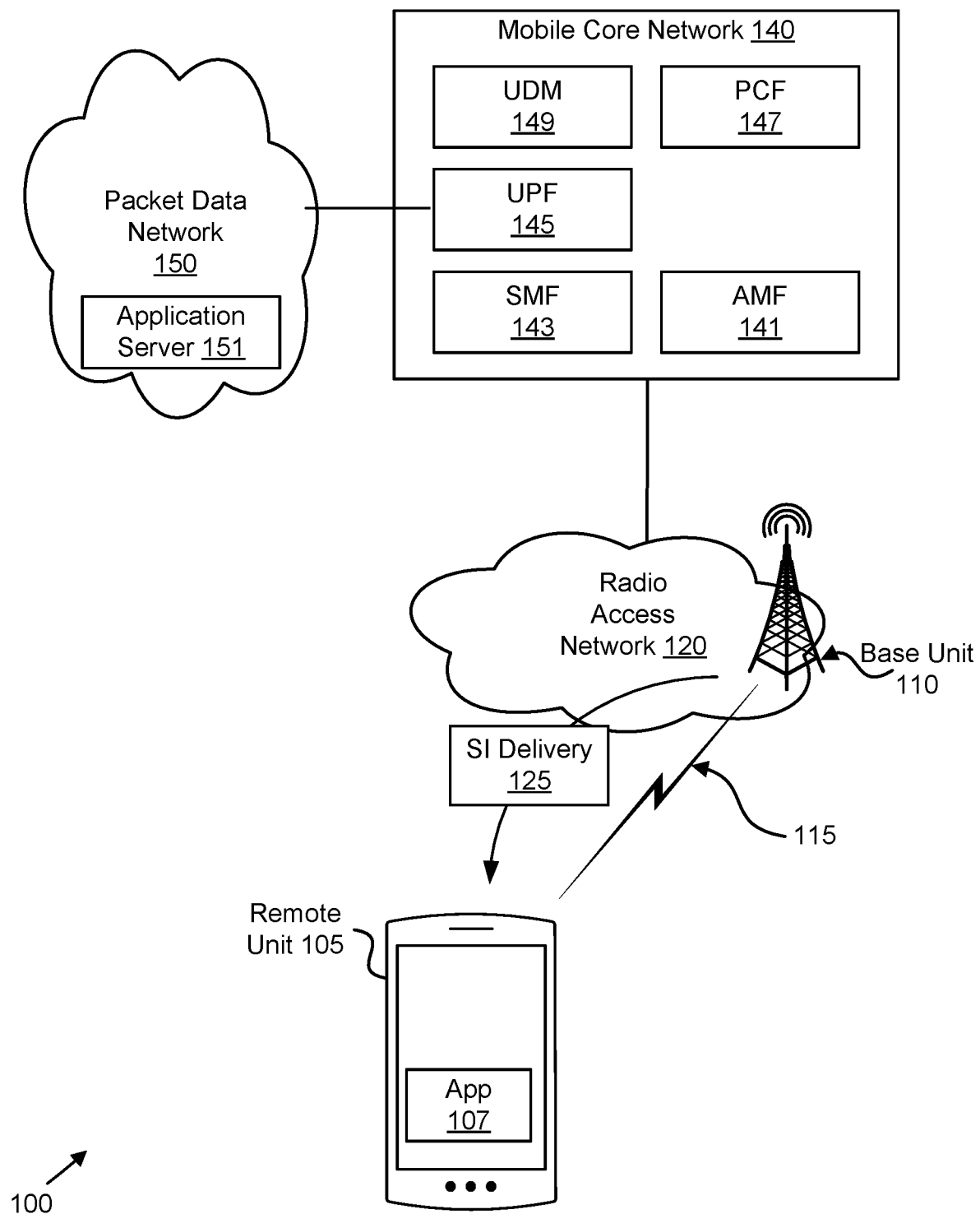
FIG. 1 is a block diagram illustrating one embodiment of a wireless communication system for SI delivery and receiving a paging message.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

As noted above, 5G NR supports BWP, namely a group of contiguous PRBs whose collective bandwidth is smaller than or equal to the maximum UE bandwidth capability, but at least as large as a bandwidth of a SS/PBCH block. Different UEs' BWPs may fully or partially overlap, and it is up to a network entity, e.g., a gNodeB ("gNB") or other suitable RAN node, to coordinate scheduling of different UEs' BWPs. Configuration parameters of a BWP may include numerology (e.g., subcarrier spacing), a frequency location (e.g., center frequency), and a bandwidth (e.g., number of PRBs). A given BWP may or may not contain a SS/PBCH block.

Multiple SS/PBCH blocks can be transmitted within a bandwidth of a carrier. However, from UE perspective, a cell is associated with a single SS/PBCH block in frequency domain. Further, a cell-defining SS/PBCH block has an associated essential system information block(s), for example, System Information Block Type1 ("SIB1") and/or System Information Block Type2 ("SIB2") which includes, so called, 'remaining minimum system information ("RMSI")', system information not included in a master information block ("MIB") but essential to accessing to a cell. Multiple cell-defining SS/PBCH blocks associated with a common NE and transmitted in the bandwidth of the carrier may or may not have common system information.

System information ("SI") messages, each of which includes at least one system information block, may be transmitted within periodically occurring time domain windows (referred to as SI-windows) using dynamic scheduling. Each SI message is associated with a SI-window and the SI-windows of different SI messages may or may not overlap. A SI-window length may be configurable and may or may not be common for all SI messages. Within a given SI-window, a corresponding SI message can be transmitted a number of times. UE can acquire detailed time and frequency domain scheduling and other information from decoding physical downlink control channel ("PDCCH") addressed by a system information-radio network temporary identifier ("SI-RNTI"). For a secondary cell ("SCell"), a network entity provides UE with the required SI by dedicated signaling. Upon change of relevant SI, the network entity releases and adds back the concerned SCell with the updated SI for the UE. However, signaling of updated SI via cell release and addition procedures may not be suitable for a primary cell ("PCell") or primary secondary cell ("PSCell").

Disclosed herein are methods, apparatuses, systems, and computer-program products to perform (re)-acquiring system information ("SI") within a wideband carrier, wherein the wideband carrier refers to a carrier which includes one or more cell-defining SS/PBCH blocks associated with a common network entity (e.g., a base station). Also disclosed are methods, apparatuses, systems, and computer-program products for receiving a paging message.

FIG. 1 depicts a wireless communication system 100 for receiving system information at a UE and receiving a paging message, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for SI delivery 125 in a wideband carrier apply to other types of communication networks, including IEEE 802.11 variants, UMTS, LTE variants, CDMA 2000, Bluetooth, and the like. For example, in an LTE variant, the AMF 141 may be mapped to an MME, the SMF 143 may be mapped to a control plane portion of a PGW, the UPF 145 may be mapped to a STW and a user plane portion of the PGW, etc.

A base unit 110, one example of a network entity, may periodically broadcast all or part of system information blocks (SIBs) in an initial active downlink (DL) BWP of a cell. A remote unit 105 initially acquires relevant SIBS for a PCell (or PSCell) in the initial active DL BWP either from broadcast signaling or from on-demand SI request procedure. If the initial active DL BWP is an active DL BWP for the remote unit 105, the remote unit 105 continues acquiring SI for the PCell (PSCell) in the initial active DL BWP. In one example, the base unit 110 sends short paging messages (e.g., a systemInfoModification message, a Commercial Mobile Alert Service (CMAS) Indication, an Earthquake and Tsunami Warning System (ETWS)-Indication, etc.) in paging downlink control information (DCI) and the remote unit 105 (re)-acquires updated SI for the PCell (or PSCell) (and/or an urgent notification after) by receiving the paging DCI carrying the short paging messages.

At a given time, if none of active DL BWP(s) for the remote unit 105 is same as the initial active DL BWP of the PCell (or PSCell), then the remote unit 105 employs one or more of the below described procedures for (re)-acquiring the broadcast SIBS. In various embodiments, a common search space ("C-SS"), which includes a set of PDCCH candidates wherein the set of PDCCH candidates may include PDCCHs for a group of UEs in a cell, or all the UEs in the cell, is configured in an active DL BWP. In other embodiments, no C-SS is configured for any of the active DL BWP(s). These scenarios are discussed in detail below.

Note that in the C-SS, PDCCHs which are supposed to be received/decoded by a group of UEs in a cell, or all the UEs in the cell, can be transmitted. In contrast, in a UE-specific search space ("U-SS"), PDCCHs which are supposed to be received/decoded only by the specific UE can be transmitted. In some embodiments, during (or after) radio resource control ("RRC") connection establishment, the remote unit 105 informs (and later updates) the base unit 110 of which SIBS it is interested in via a higher layer signaling, e.g., using a RRC message or a medium access control (MAC) bitmap.

Figure 2A:
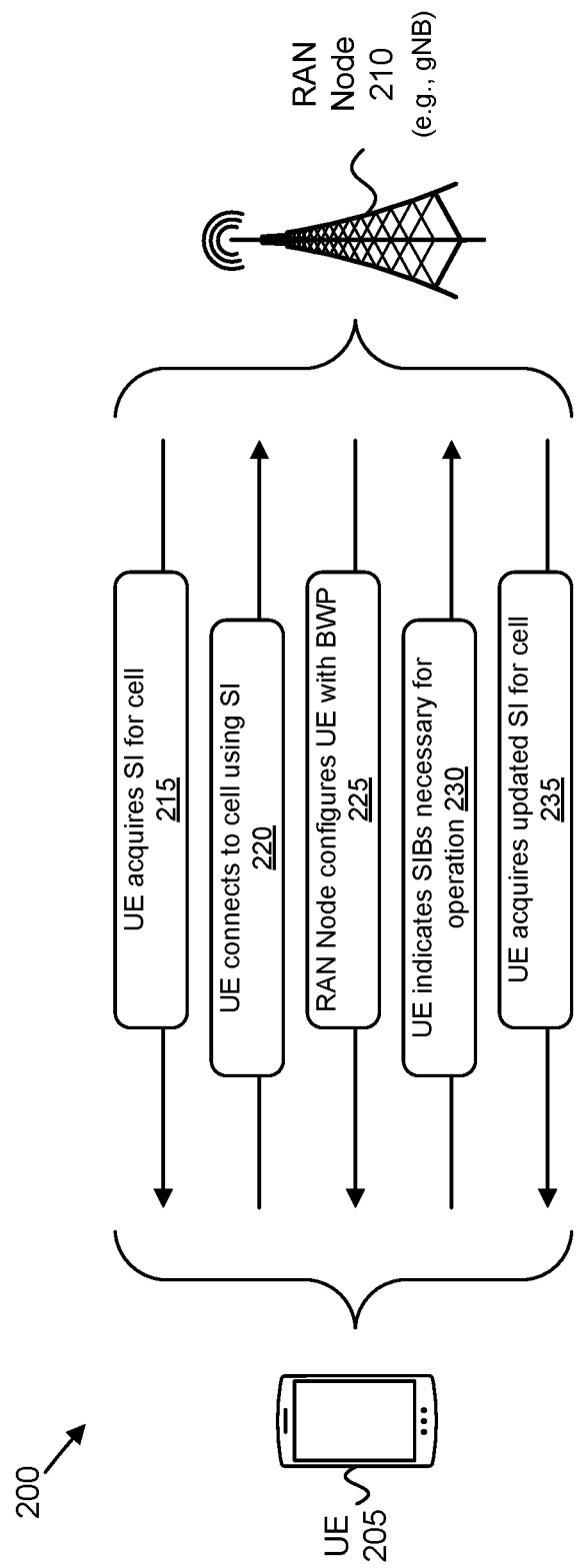
FIG. 2A is a diagram illustrating one embodiment of a network architecture for SI delivery and receiving a paging message.

FIG. 2A depicts a network 200 used for SI delivery and receiving a paging message, according to embodiments of the disclosure. The network 200 includes a UE 205 and a RAN node 210 (e.g., a transmission and reception point ("TRP")). The network 200 depicts a simplified embodiment of the wireless communication system 100. The UE 205 may be one embodiment of the remote unit 105, while the RAN node 210 may be one embodiment of the base unit 110. Here, the RAN node 210 may be a gNB or other suitable base station. Although only one UE 205 is depicted, in other embodiments the RAN node 210 may serve a plurality of the UEs 205.

Figure 2B:
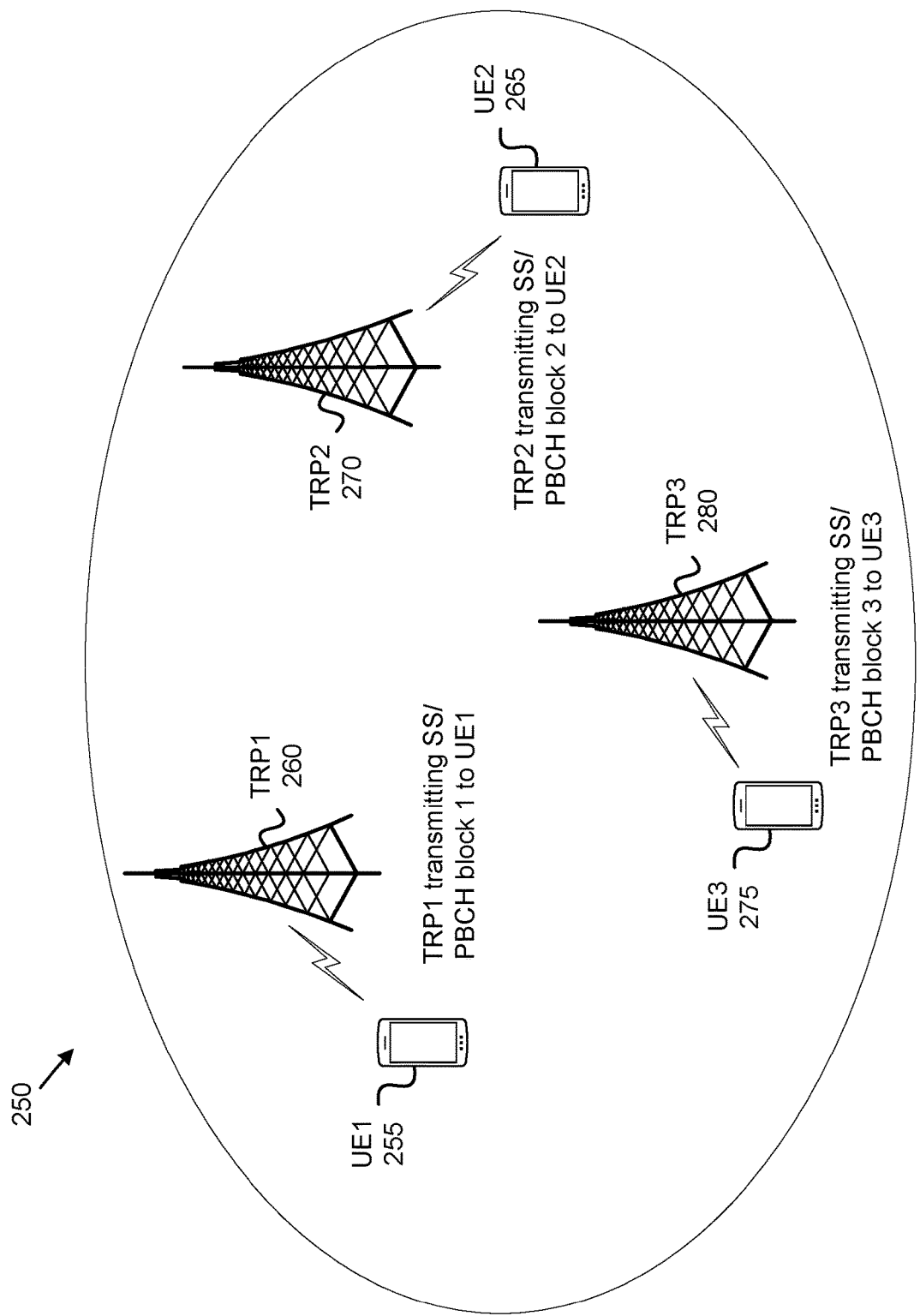
FIG. 2B illustrates one embodiment of a TRP deployment and UE association for SI delivery in a wideband carrier.
Figure 3:
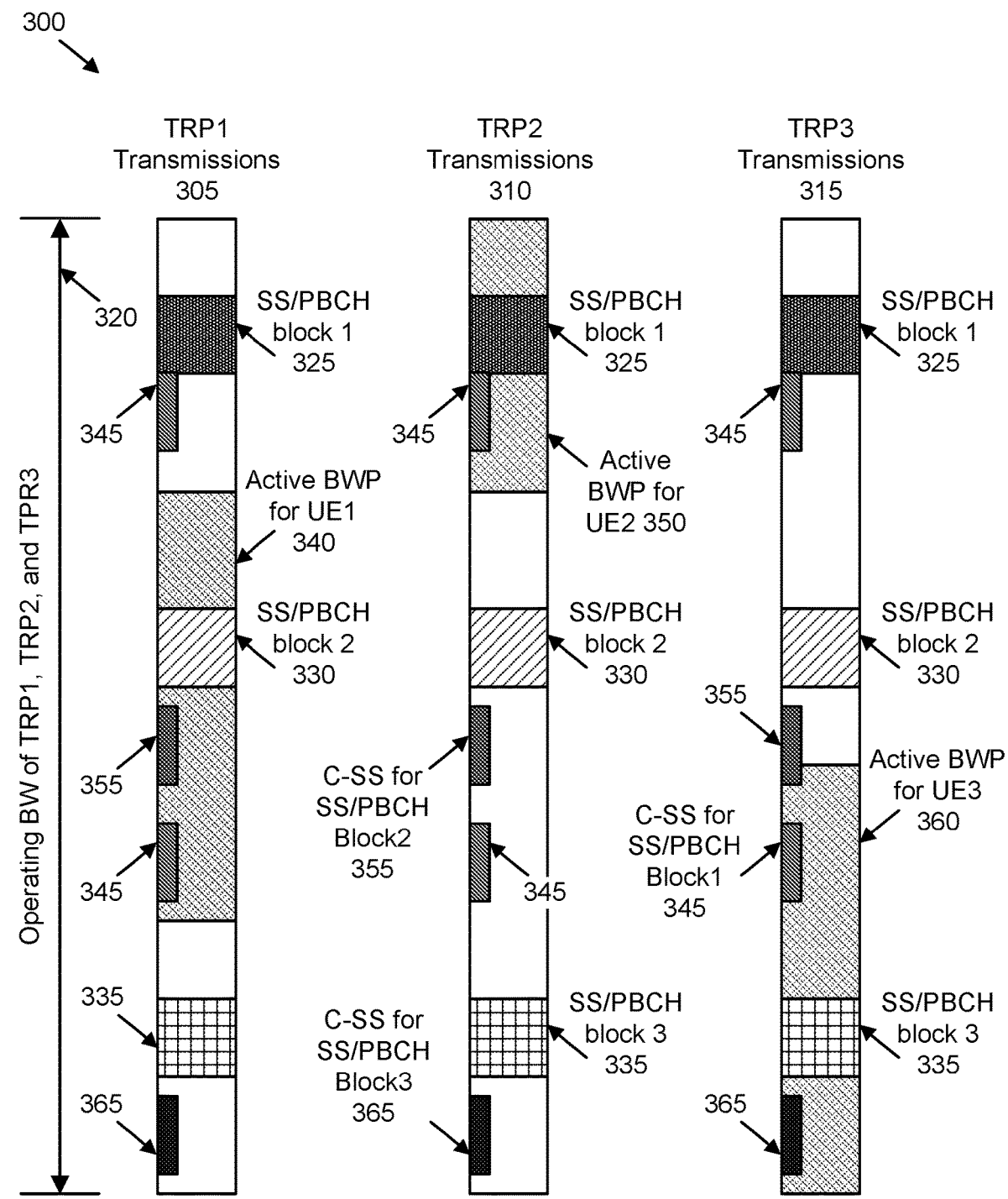
FIG. 3 is a schematic block diagram illustrating one embodiment of SS/PBCH block transmissions, common search space configurations for SS/PBCH blocks, and active BWP configurations for UEs.

FIG. 2B illustrates exemplary deployment 250 of TRP and UE association used for SI delivery, according to embodiments of the disclosure. FIG. 3 illustrates exemplary wideband carriers of the deployment 250 of FIG. 2B. The deployment 250 depicts a simplified embodiment of the wireless communication system 100. The deployment 250 includes at least a first UE ("UE1") 255, a second UE ("UE2") 265, and a third UE ("UE3") 275, as well as at least a first TRP ("TRP1") 260, a second TRP ("TRP2") 270, and a third ("TRP3") TRP 280. In other embodiments, different numbers of UEs 205 and gNBs 210 may exist in the deployment 250.

The UEs 255, 265, and 275 may be embodiments of the UE 205 and/or the remote unit 105. The TRPs 260, 270, and 280 may be embodiments of the RAN node 210 and/or the base unit 110. Here, the TRPs 260, 270, and 280 may be a gNB or other suitable base station. Although each TRP is depicted as serving only one UE, in other embodiments each of the TRPs 260, 270, and 280 may serve a plurality of UEs 205. The TRPs 260, 270, and 280 operate in the same wideband carrier (see operating bandwidth 320). Here, the TRPs 260, 270, and 280 provide different spatial coverage and transmit respective cell-defining SS/PBCH blocks in different frequency locations of the wideband carrier, as shown in FIG. 3.

According to FIGS. 2B and 3, the first UE 255 (e.g., UE1) is associated with SS/PBCH block1 325, such that the first TRP 260 transmits SS/PBCH block1 325 to the first UE 255. Similarly, the second UE 265 (e.g., UE2) is associated with SS/PBCH block2 330, such that the second TRP 270 transmits SS/PBCH block2 330 to the second UE 265. Likewise, the third UE 275 (e.g., UE3) is associated with SS/PBCH block3 335, such that the third TRP 280 transmits SS/PBCH block3 335 to the third UE 275.

FIG. 3 depicts wideband carrier operation 300, in the deployment 250. TRP1 transmission 305 include the SS/PBCH Block1 325 and transmissions to the first UE 255. TRP2 transmission 310 include the SS/PBCH Block2 330 and transmissions to the second UE 265. TRP3 transmission 315 include the SS/PBCH Block3 335 and transmissions to the third UE 275. An initial active DL BWP of the first UE 255 includes the SS/PBCH Block1 325. An initial active DL BWP of the second UE 265 includes the SS/PBCH Block2 330. An initial active DL BWP of the third UE 275 includes the SS/PBCH Block3 335. FIG. 3 also depicts a C-SS 345 for SS/PBCH Block1, a C-SS 355 for SS/PBCH Block2, and a C-SS 365 for SS/PBCH Block3.

As depicted in FIG. 3, the first UE 255 has switched active DL BWPs from its initial DL BWP (e.g., default DL BWP)

to DL BWP 340. Likewise, the second UE 265 has switched active DL BWPs from its initial DL BWP (e.g., default DL BWP) to DL BWP 350. Thus, the current active BWPs for the first UE 255 and the second UE 265 no longer contain the SS/PBCH blocks for their respected cells (e.g., SS/PBCH Block1 325 and SS/PBCH Block2 330, respectively). However, the active DL BWP 360 for the third UE 275 includes the SS/PBCH Block3 335 (and C-SS 365 for SS/PBCH Block3 335) and is assumed to be the initial DL BWP.

Note that the first UE 255 is configured with C-SS for SS/PBCH Block1 325 in its active DL BWP 340 (e.g., DL BWP 340 includes C-SS 345). However, the second UE is not configured with C-SS for SS/PBCH Block2 330 in its active DL BWP 350 (e.g., DL BWP 350 does not include C-SS 355). In some embodiments, the first TRP 260 may transmit all or a part of SIBS associated with SS/PBCH block1 in the active DL BWP for UE1 340. In certain embodiments, the first UE 255 monitors the C-SS 345 for a paging message indicating updated SI. If the first UE 255 receives (in the C-SS 345 of the active DL BWP 340) paging DCI and/or a paging PDSCH indicating SI modification, two approaches are possible:

In a first approach, the first UE 255 switches to the initial active DL BWP after reception of paging DCI and/or the paging PDSCH indicating SI modification. The first UE 255 also updates itself with the changed SI of the PCell or PSCell by receiving SIB(s) transmitted on the initial active DL BWP. That is, the first TRP 260 broadcasts SIB(s) of the cell only on the initial active DL BWP of the cell (e.g., which includes SS/PBCH Block1 325), in order to minimize the system overhead for SI delivery. This approach is discussed in further detail below with reference to FIG. 5.

In a second approach, the first UE 255 attempts to blindly decode PDCCH addressed by SI-RNTI in the C-SS 345 of the active DL BWP 340 during a modification period following the one in which the SI change notification was received in the C-SS 345. The first UE 255 further receives SI messages according to DCI in the decoded PDCCH. The PDCCH addressed by SI-RNTI in the C-SS 345 of the active DL BWP 340 indicates PDSCH carrying the SI message transmitted either in the initial active DL BWP or in a DL BWP different from the initial active DL BWP. For example, if a decoded common PDCCH indicates a common PDSCH carrying a SI message is transmitted in the initial active DL BWP associated with SS/PBCH block1, the first UE 255 retunes to its initial active DL BWP and receives the corresponding SI message. This approach is discussed in further detail below with reference to FIG. 6.

In some embodiments, the second TRP 270 may transmit all or a part of SIBs associated with SS/PBCH Block2 in the active DL BWP for UE2 350. In certain embodiments, the second UE 265 may periodically switch back to its initial DL BWP (e.g., containing SS/PBCH Block2) according to a DL gap pattern. During the gaps of the DL gap pattern, no DL data/messages are to be sent to the second UE 265 in the DL BWP 350. Thus, during the DL gaps the second UE 265 is able to retune to its initial DL BWP to monitor for a message indicating updated SI. If the second UE 265 receives an indication of SI modification (e.g., indicating updated SI), the second UE 265 proceeds to acquire one or more SIBs or SI messages carrying the updated SI, as discussed in further detail below with reference to FIGS. 7 and 8.

Note that because the third UE 275 has an active DL BWP that includes the SS/PBCH Block3 and the associated C-SS 365, the third TRP 280 may transmit all or a part of SIBS associated with SS/PBCH block in the active DL BWP 360.

Thus, the third TRP 280 may send updated SI over the initial active DL BWP of the third UE 275 and the third UE 275 does not need to switch DL BWP in order to receive the updated SI.

Figure 4:
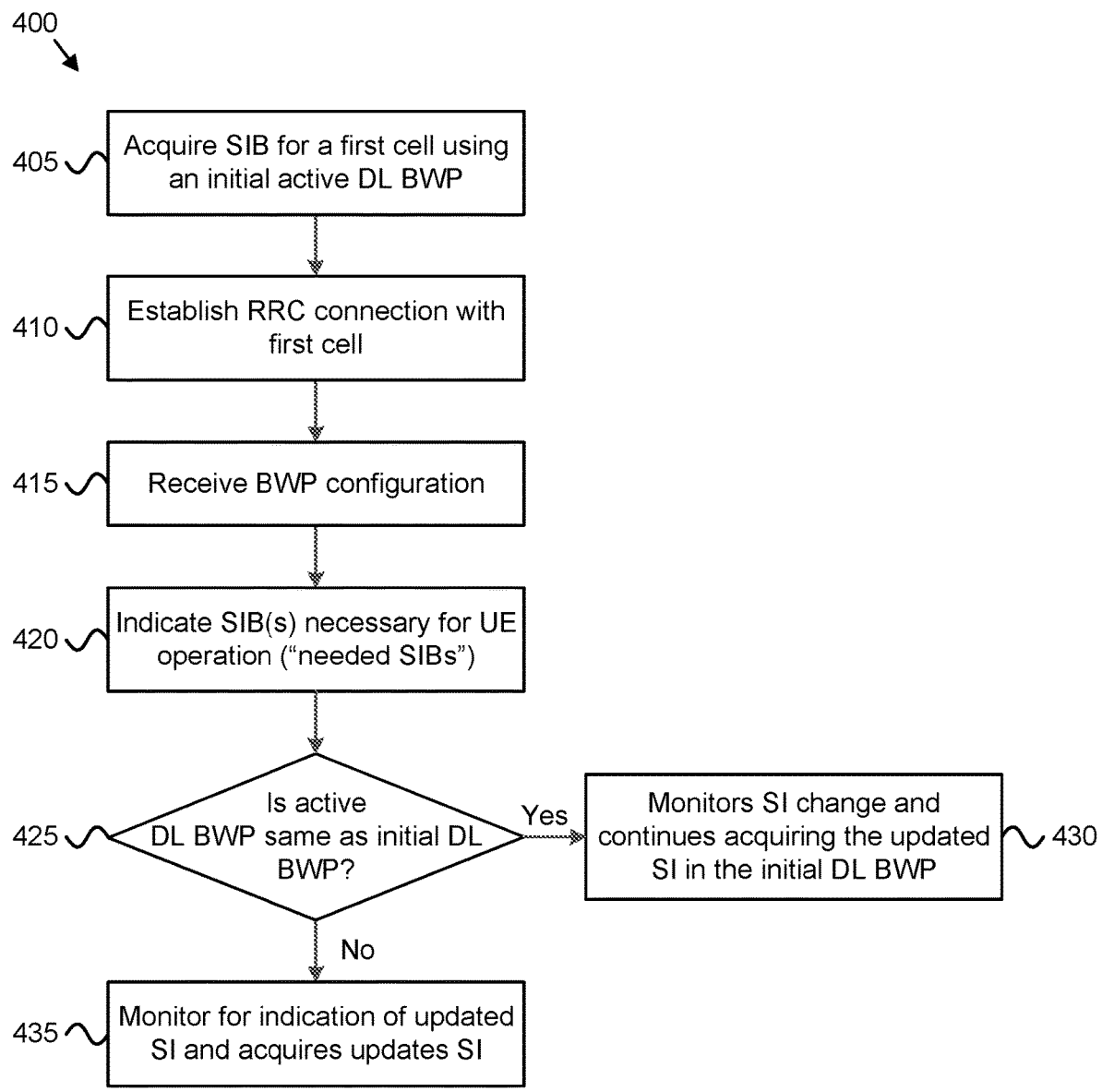
FIG. 4 is a diagram illustrating one embodiment of a process for initial SI acquisition.

FIG. 4 is a diagram illustrating one embodiment of a procedure 400 for initial SI acquisition, e.g., in a wideband carrier. The procedure 400 may be implemented by a remote unit 105, such as the UE 205, the first UE 255, the second UE 265, and/or the third UE 275. The remote unit 105 acquires at least one SIB for a first cell in an initial active DL BWP (see block 405). The first cell may be associated with a specific base unit 110, such as the RAN node 210, the first TRP 260, the second TRP 270, and/or the third TRP 280. Further, the first cell may be a primary cell of the remote unit 105. Here, the SIB(s) may be essential system information block(s) associated with a cell-defining SS/PBCH block. As discussed above, the SIB may be broadcast periodically by the base unit 110. The remote unit 105 may also acquire one or more SIBS using an on-demand SI request procedure. The system information acquired here by the remote unit 105 is referred to as "initial system information."

Having received the at least one SIB, the remote unit 105 establishes an RRC connection with the first cell (see block 410). Here, the remote unit 105 establishes the RRC connection based on the acquired initial system information. After establishing the RRC connection, the base unit 110 configures the remote unit 105 with at least one DL BWP of the first cell (see block 415). Here, the base unit 110 may use higher layer signaling (e.g., RRC messages, MAC control elements, etc.) to send the DL BWP configuration.

During RRC connection establishment, the remote unit 105 may inform the base unit 110 of one or more SIBs it is interested in, e.g., SIBs necessary for UE operation (see block 420). Alternatively, the remote unit 105 may inform the base unit 110 of the one or more SIBs necessary for UE operation after RRC connection establishment. The one or more SIB s necessary for UE operation are referred to as "needed SIBs." In various embodiments, the remote unit 105 uses higher layer signaling, such as an RRC message or MAC bitmap, to indicate the needed SIB s.

Moreover, the remote unit 105 may further receive an indication of a first DL BWP selected from the configured BWP(s) of the first cell to be an active DL BWP for the remote unit 105. Regarding reacquisition of SI, for example acquiring updated SI of the first cell, the remote unit 105 determines whether the active DL BWP is the same as the initial DL BWP (see decision block 425). If the active DL BWP is the same as the initial DL BWP, then the remote unit 105 monitors system information change and continues acquiring the updated system information in the initial DL BWP (see block 430). Here, the base unit 110 may send short paging messages, such as systemInfoModification, in paging DCI in the initial DL BWP.

However, if the active DL BWP is different from the initial DL BWP, then the remote unit 105 monitors for an indication of updated system information and acquires the updated system information (see block 435) according to one or more of the procedures discussed below with reference to FIGS. 5-8.

Figure 5:
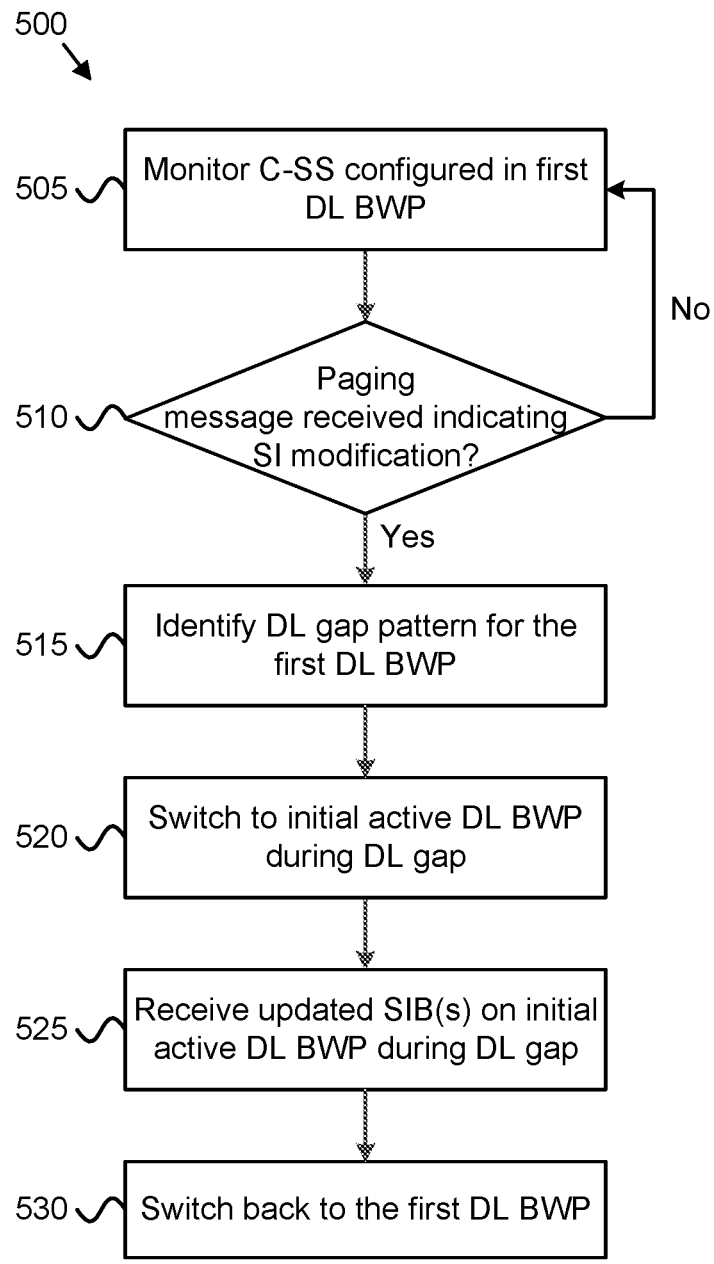
FIG. 5 is a diagram illustrating one embodiment of a process for acquiring modified SI when C-SS is configured for the active DL BWP.

FIG. 5 depicts a first procedure 500 for acquiring modified SI when common search space ("C-SS") is configured for the active DL BWP, according to embodiments of the disclosure. The first procedure 500 is one embodiment of step 435 in the procedure 400 and allows for acquisition of (e.g., modified) system information when the active DL BWP for the remote unit 105 is not the initial DL BWP. The first procedure 500 corresponds to the use case where a C-SS is configured in the active DL BWP of the remote unit 105. Referring to FIGS. 2A and 3, the first procedure 500 may be implemented by the first UE 255 because the active BWP 340 of the first UE 255 includes the C-SS 345 for SS/PBCH Block1.

In the first use case, a common search space ("C-SS") is configured in an active DL BWP for a remote unit 105, such as the first UE 255. Here, the C-SS is UE-specifically configured in a given active DL BWP. Here, the given active DL BWP is referred to as a "first DL BWP." However, note that the "first DL BWP" is different than the initial active DL BWP. When so configured, the remote unit 105 monitors the C-SS configured in the first DL BWP.

The base unit 110 implicitly or explicitly configures one or more DL gap patterns. As used herein, a "DL gap pattern" refers to a pattern of recurring DL gaps. During a DL gap, the remote unit 105 is not expected to receive any DL signal/channel in the current active DL BWP. Said otherwise, the TRP (here the base unit 110) may not transmit any DL message or data to the remote unit 105 in the first DL BWP during a DL gap. The base unit 110 configures each of the one or more DL gap patterns taking into account one or more SI-window (e.g., periodically occurring time domain windows) configurations for broadcast SIB s. In various embodiments, the base unit 110 broadcasts SIBS of the cell only on the initial active DL BWP of the cell in order to minimize system overhead for SI delivery. In such embodiments, the remote unit 105 must retune to the initial active DL BWP (or default DL BWP) to receive updated SI.

The remote unit 105 monitors a C-SS configured in the first DL BWP (see block 505). The remote unit 105 determines whether paging message is received (e.g., via paging DCI or paging PDSCH in the C-SS in the first DL BWP) indicating SI modification (see decision block 510). As discussed above, SI modification may be indicated using a short paging message, such as "systemInfoModification."

Upon receiving indication of SI modification, the remote unit 105 determines which DL gap pattern(s) it needs to employ in the first DL BWP (see block 515). Here, selection of the DL gap pattern(s) may be based on the SIBs that it has to re-acquire (e.g., the needed SIBS previously indicated to the base unit 110). Note that the base unit 110 is also able to determine which DL gap pattern(s) the remote unit 105 needs to employ, as the remote unit 105 transmits an indication of the needed SIBS (e.g., via higher layer signaling) during the initial acquisition procedure discussed above with reference to FIG. 4.

Having identified the appropriate DL gap pattern(s), the remote unit 105 switches (e.g., retunes its receiver) to the initial active DL BWP (or default DL BWP) during a DL gap (see block 520). In various embodiments, the DL gap is the first occurring DL gap in the selected DL gap pattern after the indication of SI modification is received (e.g., the next occurring DL gap after the paging DCI or paging PDSCH). Also, during the DL gap, the remote unit 105 receives one or more updated SIBs in the initial active DL BWP (see block 525). Because the base unit 110 has identified which DL gap pattern(s) the UE 205 will employ for SI re-acquisition, during the DL gap of the first DL BWP the base unit 110 can transmit to the remote unit 105 (and the remote unit 105 can receive) UE-specific PDCCH and PDSCH (in addition to common PDCCH and PDSCH) in the initial active DL BWP.

In one example, the remote unit 105 applies a determined DL gap pattern on slot 'n+k' or later if receiving paging DCI or paging PDSCH indicating SI modification on slot 'n'. Here, the value 'k' may be pre-defined, UE-specifically configured, or cell-specifically configured. Further, the remote unit 105 assumes that the actual DL gap for the first DL BWP occurs in a modification period following the one in which the SI change notification was received.

In another example, a remote unit 105 using a DRX cycle shorter than or equal to the modification period, verifies that stored system information remains valid by applying a default DL gap pattern for the first DL BWP, receiving SystemInformationBlockType1 in the initial active DL BWP after the modification period boundary, and checking systemInfoValueTag in the received SystemInformationBlockType. Here, the default DL gap pattern is configured for allowing the UE 205 to receive SystemInformationBlockType.

In various embodiments, at the end of the DL gap the remote unit 105 switches back to the first DL BWP (see block 530). The remote unit 105 may continue monitoring the C-SS for further indications of SI modification.

Figure 6:
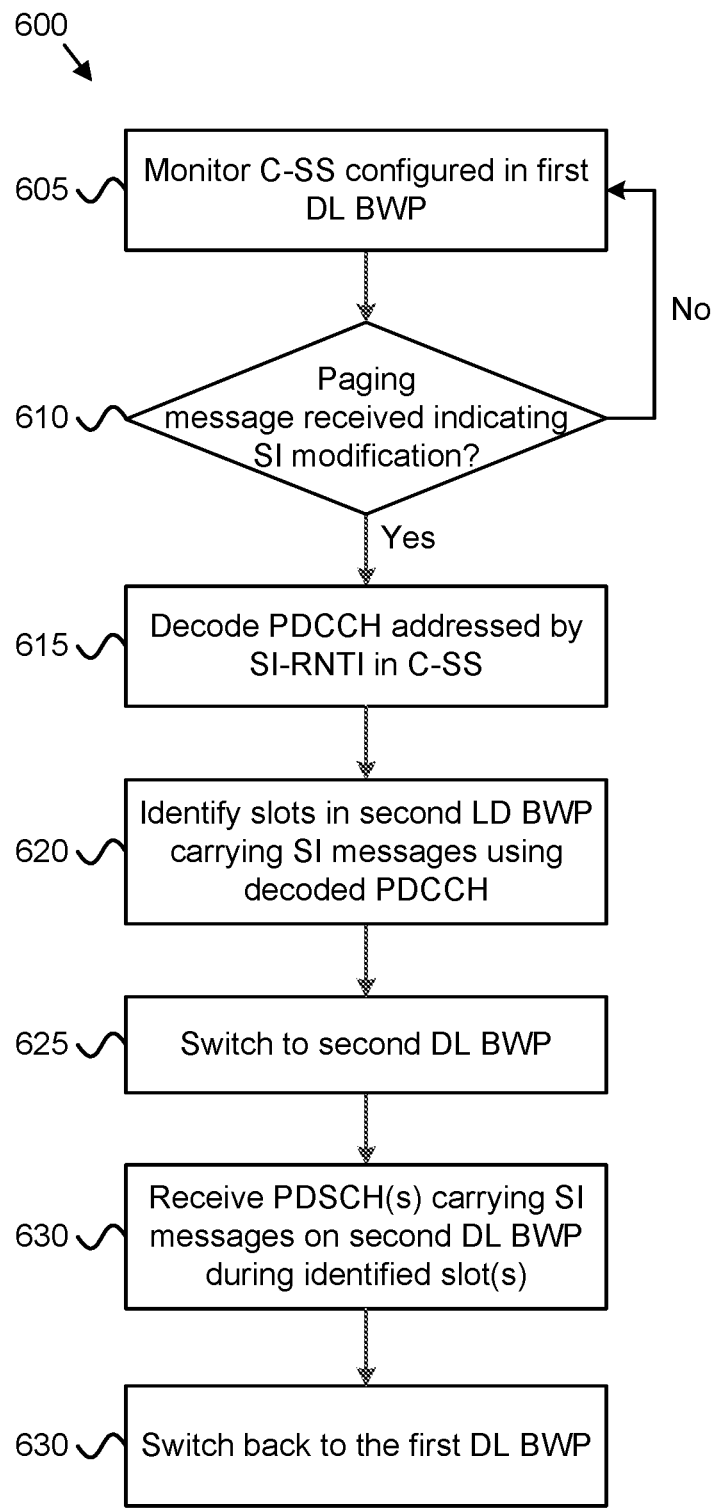
FIG. 6 is a diagram illustrating another embodiment of a process for acquiring modified SI when C-SS is configured for the active DL BWP.

FIG. 6 depicts a second procedure 600 for acquiring modified SI when common search space ("C-SS") is configured for the active DL BWP, according to embodiments of the disclosure. The second procedure 600 is another embodiment of step 435 in the procedure 400 and allows for acquisition of (e.g., modified) system information when the active DL BWP for the remote unit 105 is not the initial DL BWP. The second procedure 600 corresponds to an alternative approach to the first use case discussed above, where a C-SS is configured in the active DL BWP of the remote unit 105. Referring to FIGS. 2A and 3, the second procedure 600 may be implemented by the first UE 255 because the active BWP 340 of the first UE 255 includes the C-SS 345 for SS/PBCH Block1.

The remote unit 105 monitors a C-SS configured in the first DL BWP (see block 605). The remote unit 105 determines whether paging message is received (e.g., via paging DCI or paging PDSCH in the C-SS in the first DL BWP) indicating SI modification (see decision block 610). As discussed above, SI modification may be indicated using a short paging message, such as "systemInfoModification."

Upon receiving indication of SI modification, the remote unit 105 decodes (e.g., attempts to blindly decode) PDCCH addressed by SI-RNTI in the C-SS of the first DL BWP during the modification period following the one in which the SI change notification was received (see block 615). In certain embodiments, PDCCH addressed by SI-RNTI in the C-SS of the active DL BWP (e.g., the first DL BWP) indicates PDSCH carrying the SI message transmitted in a second DL BWP. Here, the second DL BWP may be the initial active DL BWP or a DL BWP different from the initial active DL BWP. In one embodiment, the second DL BWP is the same as the first DL BWP. In other embodiments, the second DL BWP is different than the first DL BWP.

In one example, the base unit 110 transmits PDSCH(s) carrying SI messages only in the initial active DL BWP for system overhead reduction. In another example, the base unit 110 transmits multiple PDSCH(s) carrying the same SI message in the frequency domain, at least including the first DL BWP, so that the remote unit 105 does not have to retune from the first DL BWP to the initial active DL BWP. In yet another example, some SI messages are transmitted only in the initial active DL BWP of the cell, and other SI messages are transmitted multiple instances in the frequency domain (e.g., transmitted in both the first DL BWP and the initial active DL BWP).

Additionally, the remote unit 105 uses the PDCCH addressed by SI-RNTI in the C-SS of the first DL BWP to identify one or more slots in which PDSCH(s) carrying the SI messages are transmitted on the second DL BWP (see block 620). Note that in the embodiments of FIG. 6, the remote unit 105 does not need to be configured with DL gap patterns nor does the remote unit 105 need to identify which DL gap pattern to employ. Instead, the PDCCH addressed by SI-RNTI is used to identify when the SI messages containing modified/updated SI are to be delivered.

Where the second DL BWP is different than the first DL BWP, the remote unit 105 switches (e.g., retunes) to the second DL BWP at an appropriate time based on the identified one or more slots (see block 625). The time at which the remote unit 105 retunes to the second DL BWP may be based on the capabilities of the remote unit 105.

Additionally, the remote unit 105 receives at least one PDSCH (e.g., receives messages on one or more PDSCH) in the second DL BWP carrying SI messages during the identified slot(s) (see block 630). Because the base unit 110 is able to identify which slots the remote unit 105 will tune to in the second DL BWP (unless remote unit 105 misses the DL resource assignment(s) for PDSCH(s) carrying the SI messages of interest), the base unit 110 can transmit UE-specific PDCCH and/or UE-specific PDSCH to the remote unit 105 in the second DL BWP during the identified slot(s). For those slots, the remote unit 105 may monitor UE-specific PDCCH and potentially receive UE-specific PDSCH in addition to reception of PDSCH(s) carrying the SI messages in the second DL BWP. Moreover, the base unit 110 does not transmit any DL signal/channel for the remote unit 105 in the first DL BWP during the identified slot(s).

In various embodiments of the second procedure 600, the remote unit 105 switches back to the first DL BWP after receiving a modified system information (see block 635). The remote unit 105 may continue monitoring the C-SS for further indications of SI modification.

In various embodiments of the first procedure 500 and/or second procedure 600, the system information change indication in paging message or paging DCI includes an indication of at least a portion of the one or more SIBS (or SI messages) that will change. The change of specific SIBS (or SI messages) may be indicated by a SI message-specific value tag (e.g., systemInfoValueTag/systemInfoConfigurationIndex) and/or an area ID (e.g., systemInfoAreaIdentifier) associated with the SIB (or SI message). Here, the remote unit 105 may receive only the SIBS or SI messages containing modified SI.

However, if the SI change indication on the active/first DL BWP in a modification period: a) does not include any information of which SIBs (or SI messages) have changed or b) indicates that SIB1 needs to be reacquired, then the remote unit 105 may retune to a second DL BWP at the next modification period boundary to acquire the changes to the SI. The second DL BWP may be an initial active DL BWP or a second DL BWP which may be configured by the gNB for SI reception. In one embodiment, the second DL BWP used to re-acquire SI may be indicated in the SI change indication.

In one example, the remote unit 105 retunes to the second DL BWP for a duration equal to the modification period. In the context of the first procedure 500, the DL gap includes the modification period and may also include the retuning time (one or more OFDM symbols or slots) for switching between the first DL BWP and the second DL BWP. The remote unit 105 may not be expected to receive DL in a portion of the slot corresponding to the BWP retuning time at the end of the preceding modification period and at the start of the subsequent modification period (e.g., following the modification period in which updated SI is provide).

In one example, the remote unit 105 acquires updated SI information corresponding to the SIBS provided via periodic broadcast basis as indicated in SIB1 on the second DL BWP and updated SI corresponding to the SIBs provided via only on-demand basis on the first DL BWP by performing SI request on the first DL BWP. Information for the remote unit 105 to perform SI request on the first DL BWP may be indicated in the SIB1 or configured to the remote unit 105, e.g., during a BWP configuration procedure.

In some examples, following reacquiring of SIB1 (if needed) which includes time-domain scheduling information (e.g., periodicity, SI-window size) of SI messages, information on the availability of other SIBS and to which SI-message a particular SIB is mapped to (a SI-message may carry one or more SIBs), to reacquire an SI-message with updated SIB(s) SI information, the UE 205 may retune/switch to the second DL BWP at the start of the SI-window corresponding to the SI-message to receive the SI-message. Here, the duration of the switch/retuning to the second DL BWP may be the duration of the SI-window.

If the remote unit 105 requires more than one SI-message with SI-windows in close proximity (e.g., having a gap between the SI-window occasions of different SI-message of less than a certain number of slots/subframes), the duration of the switch/retuning to the second DL BWP may last from the beginning of the earliest SI-window to the end of the latest SI-window of the SI-windows corresponding to the more than one SI-message. Here, the number of slots/subframes may be pre-configured (e.g., hard-coded in specification) or configured to the remote unit 105 (e.g., based on UE capability).

In some examples, the remote unit 105 may accumulate SI-Message transmissions across several SI-Windows within the Modification Period. Here, the number of SI-windows to accumulate may be pre-configured/hard-coded in specification or configured to the remote unit 105, e.g., based on UE capability and may be relative to the start of the modification period. The number of SI-windows the remote unit 105 may monitor for SI message reception may be different for periodic broadcast SI-messages (SI message acquisition not triggered due to UE request) than for on-demand SI-messages (SI message acquisition triggered due to UE request). The remote unit 105 may take the number of SI-windows to accumulate for a SI-message into account to determine the number of retuning/DL gap periods and the retuning/gap period the remote unit 105 is allowed for switching to the second DL BWP to acquire updated SI information.

In one example, a remote unit 105 receives an indication that the first DL BWP is different than the second DL BWP on which SI information is transmitted for at least periodic broadcast SIBS, thereby requiring the remote unit 105 to retune/switch to the second DL BWP to receive at least the updated periodic broadcast SIBS (due to SI change indication). Here, the remote unit 105 may, after acquiring the updated SI information for all the required SIBS (or at least the periodic broadcast SIBs on the second DL BWP), indicate/acknowledge to the base unit 110 successful completion of the SI update procedure for all the required SIB s (or at least the periodic broadcast SIBS on the second DL BWP). This acknowledgement may be sent on the first DL BWP and may correspond to a dedicated SR signal, a PRACH signal, or a SI acknowledgement higher layer signaling (e.g., MAC CE) sent on PUSCH. During the retuning/switch/gap period on the second DL BWP, the remote unit 105 may receive UE-specific PDCCH and PDSCH in the second DL BWP.

Figure 7:
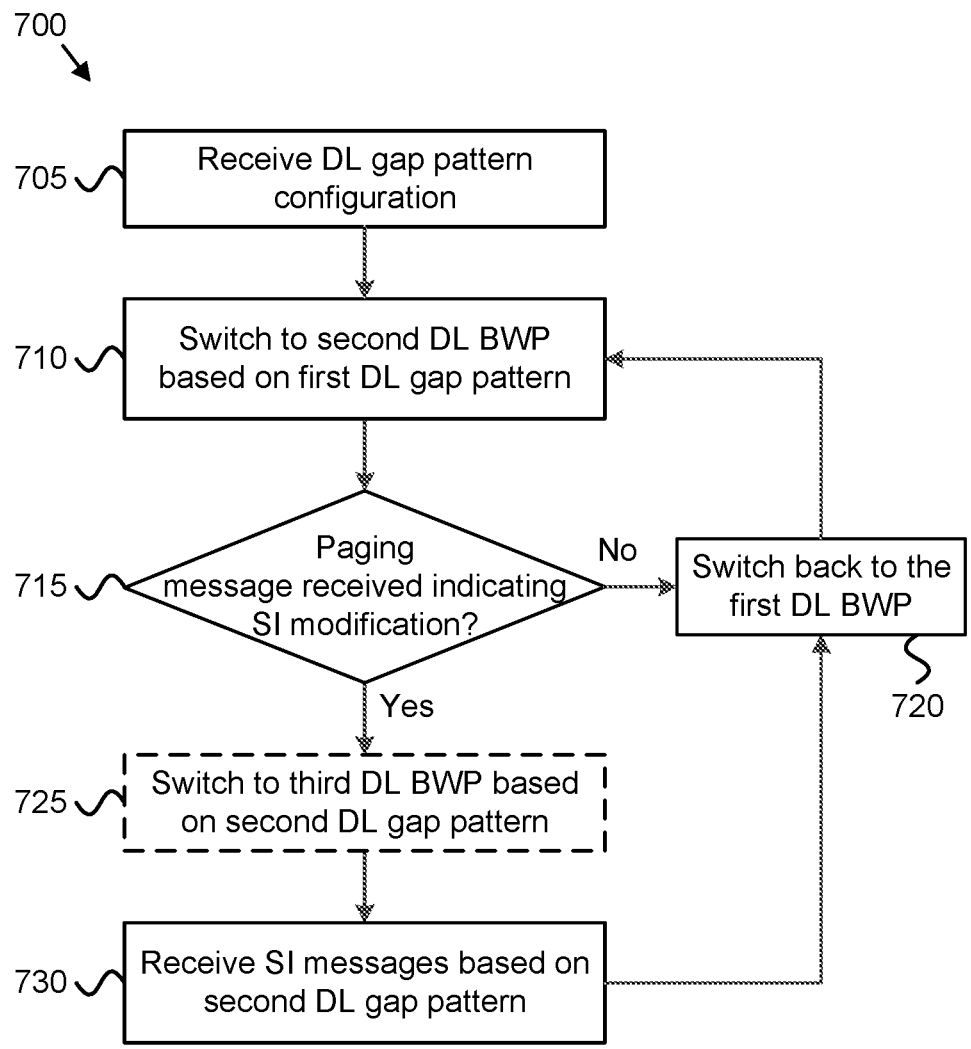
FIG. 7 is a diagram illustrating one embodiment of a process for acquiring modified SI when C-SS is not configured for the active DL BWP.

FIG. 7 depicts a third procedure 700 for acquiring modified SI when common search space ("C-SS") is not configured for the active DL BWP, according to embodiments of the disclosure. The third procedure 700 is another embodiment of step 435 in the procedure 400 and allows for acquisition of (e.g., modified) system information when the active DL BWP for the remote unit 105 is not the initial DL BWP. The third procedure 700 corresponds to a first approach to a second use case, where a C-SS is not configured in the active DL BWP of the remote unit 105. Referring to FIGS. 2A and 3, the third procedure 700 may be implemented by the second UE 265 because the active BWP 350 of the second UE 265 does not include the C-SS 355 for SS/PBCH Block2.

The remote unit 105 receives a DL gap pattern (see block 705). In the second use case, C-SS is not configured for any of active DL BWP(s) of the remote unit 105, thus the remote unit 105 cannot monitor a C-SS for paging messages related to SI modification. In one embodiment, the base unit 110 (e.g., the second TRP 270) may configure the remote unit 105 (e.g., the second UE 265) with a first DL gap pattern for at least one active DL BWP. In certain embodiments, the remote unit 105 may be configured with a second DL BWP for reception of paging messages and/or SI messages. In various embodiments, the second DL BWP is the initial active DL BWP of the remote unit 105. Here, the first DL gap pattern is used by the remote unit 105 for reception of paging messages (or paging DCI) indicating the SI modification in a second DL BWP of the cell. Based on reported UE capability information, the base unit 110 may command the remote unit 105 to apply the signaled first DL gap pattern for all active BWPs without C-SS or for some selected active BWPs.

Accordingly, the remote unit 105 switches to the second DL BWP based on the first DL gap pattern (see block 710). As discussed above, the DL gap pattern indicates time periods in which no DL channels/signals are transmitted to the remote unit 105 on the first DL BWP (e.g., active DL BWP). Note that the base unit 110 may transmit DL channels/signals to other served units during a DL gap of the remote unit 105. Similarly, other base units 110 sharing the same wideband carrier may also transmit DL channels/signals to other serve units during a DL gap of the remote unit 105.

During at least a part of the DL gap, the remote unit 105 monitors the second DL BWP for reception of paging messages indicating SI modification (see block 715). Note that the DL gap may include time for the remote unit 105 to retune its receiver to the second DL BWP (and additional time to retune the receiver to the first DL BWP). If no paging messages indicating SI modification are received in the second DL BWP, the remote unit 105 switches back to the first DL BWP (see block 720). Note that the remote unit 105 may again switch to the second DL BWP based on the first DL gap pattern to monitor for paging messages indicating SI modification.

In certain embodiments, the remote unit 105 is configured with a third DL BWP for receiving SI messages. In some embodiments, the third DL BWP is different than the second DL BWP use for receiving paging messages indicating SI modification. In one embodiment, the third DL BWP may be the initial active DL BWP. Alternatively, the third DL BWP may be different than the initial active DL BWP.

Moreover, the remote unit 105 may be configured with a second DL gap pattern used for reception of SI messages that the remote unit 105 is interested in. The second DL gap pattern may have a different arrangement of DL gaps and/or different duration of DL gaps than the first DL gap pattern. In various embodiments, the remote unit 105 applies the second DL gap pattern for reception of the SI messages, only if remote unit 105 receives paging DCI or a paging message indicating SI modification (see block 725). During the DL gap in the at least one active DL BWP (e.g., of the first or second DL gap pattern), the remote unit 105 can receive UE-specific PDCCH and PDSCH in the initial active DL BWP or the (second) DL BWP configured for reception of the SI messages (see block 730).

In various embodiments of the third procedure 700, the remote unit 105 switches back to the first DL BWP after receiving the modified system information (see block 720). The remote unit 105 may continue switching to the second DL BWP to monitor for further indications of SI modification based on the first DL gap pattern.

Figure 8:
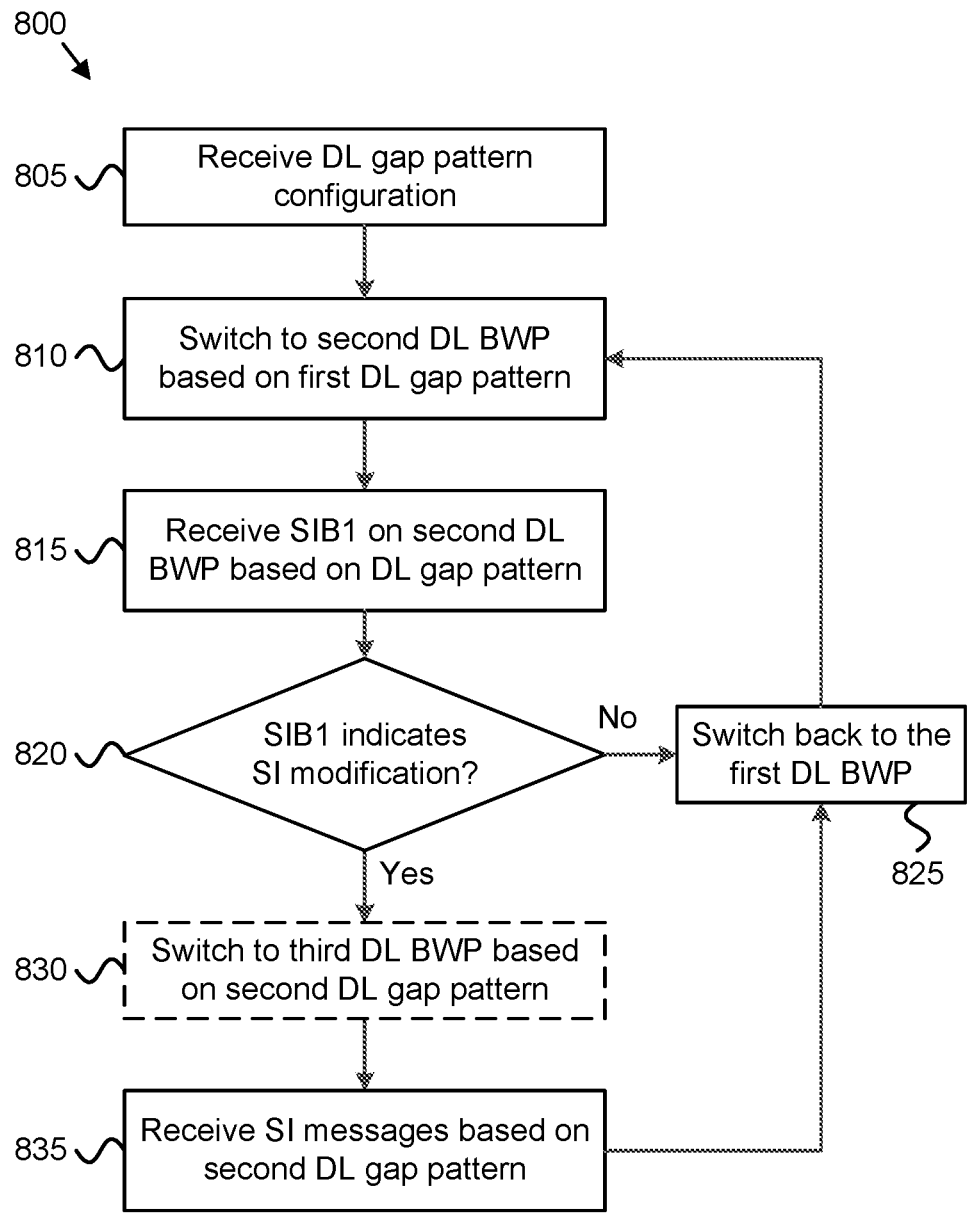
FIG. 8 is a diagram illustrating another embodiment of a process for acquiring modified SI when C-SS is not configured for the active DL BWP.

FIG. 8 depicts a third procedure 800 for acquiring modified SI when common search space ("C-SS") is not configured for the active DL BWP, according to embodiments of the disclosure. The third procedure 800 is another embodiment of step 435 in the procedure 400 and allows for acquisition of (e.g., modified) system information when the active DL BWP for the remote unit 105 is not the initial DL BWP. The third procedure 800 corresponds to a second approach to the second use case, where a C-SS is not configured in the active DL BWP of the remote unit 105. Referring to FIGS. 2A and 3, the third procedure 800 may be implemented by the second UE 265 because the active BWP 350 of the second UE 265 does not include the C-SS 355 for SS/PBCH Block2.

The remote unit 105 receives a DL gap pattern (see block 805). In some embodiments, the base unit 110 (e.g., the second TRP 270) may configure the remote unit 105 (e.g., the second UE 265) with a first DL gap pattern for at least one active DL BWP. In certain embodiments, the remote unit 105 may be configured with a second DL BWP for reception of paging messages and/or SI messages. In various embodiments, the second DL BWP is the initial active DL BWP of the remote unit 105.

Here, the first DL gap pattern is used by the remote unit 105 for reception of System Information Block Type1 (SIB1), e.g., in the initial active DL BWP, after the modification period boundary. Based on reported UE capability information, the base unit 110 may command the remote unit 105 to apply the signaled first DL gap pattern for all active BWPs without C-SS or for some selected active BWPs. Accordingly, the remote unit 105 switches to the second DL BWP (e.g., initial active DL BWP) based on the first DL gap pattern (see block 810).

During at least a part of the DL gap, the remote unit 105 receives the SIB1 on the second DL BWP (see block 815). In various embodiments, SIB1 is transmitted in the initial active DL BWP, thus the remote unit 105 switches to the initial active DL BWP based on the first DL gap pattern to receive SIB1. Additionally, the remote unit 105 determines whether the SIB1 indicates SI modification (see block 820).

In various embodiments, the remote unit 105 checks a systemInfoValueTag in the received SIB1 to determine whether to update the stored system information or not. For example, the remote unit 105 may determine whether the existing stored system information is not valid any more based on checking of systemInfoValueTag in the received SIB1. The remote unit 105 may also check the area ID (systemInfoAreaIdentifier) in the received SIB1. In one embodiment, the value tag and area ID may be common for all SIBS and SI-messages such that the remote unit 105 is informed about changes in system information with change to the value tag and/or area ID, but no further details are provided e.g. regarding which system information will change. In another embodiment, the value tag and area ID may be SIB1 and SI-message specific indicating SI change for SIB1 and/or for the specific SI-message.

If SIB1 does not indicate SI modification, then the remote unit 105 may switch back to the first DL BWP (see block 825). Note that the remote unit 105 may again switch to the second DL BWP based on the first DL gap pattern to monitor for paging messages indicating SI modification.

In certain embodiments, the remote unit 105 is configured with a third DL BWP for receiving SI messages. In some embodiments, the third DL BWP is different than the second DL BWP use for receiving SIB1 indicating SI modification. In one embodiment, the third DL BWP may be the initial active DL BWP. Alternatively, the third DL BWP may be different than the initial active DL BWP.

Moreover, the remote unit 105 may be configured with a second DL gap pattern used for reception of SI messages that the remote unit 105 is interested in. The second DL gap pattern may have a different arrangement of DL gaps and/or different duration of DL gaps than the first DL gap pattern. In various embodiments, the remote unit 105 applies the second DL gap pattern for reception of the SI messages, only if the remote unit 105 identifies that the existing stored system information is not valid any more, e.g., based on checking of systemInfoValueTag in the received SIB1. The remote unit 105 may also check the area ID (systemInfoAreaIdentifier) in the received SIB1, as discussed above. During the DL gap in the at least one active DL BWP (e.g., of the first or second DL gap pattern), the remote unit 105 can receive UE-specific PDCCH and PDSCH in the initial active DL BWP or the (second) DL BWP configured for reception of the SI messages (see block 835).

In various embodiments of the third procedure 800, the remote unit 105 switches back to the first DL BWP after receiving the modified system information (see block 825). The remote unit 105 may continue switching to the second DL BWP to monitor for further indications of SI modification based on the first DL gap pattern.

In other embodiments of step 435 of FIG. 4, the base unit 110 may send the updated SI messages via dedicated signaling (e.g. UE-specific PDCCH and/or PDSCH) to the remote unit 105 operated in an active DL BWP different from the initial active DL BWP. In one example, the base unit 110 pushes all SI messages when any change happens or when ETWS or CMAS becomes available. In another example, the base unit 110 pushes SIB s in which the remote unit 105 is interested, only when necessary, e.g. a change of these SIBS occur or some of these SIBS become available. In both examples, the base unit 110 is responsible to maintain or send the up-to-date system information to the UE. Thus, the remote unit 105 does not treat the cell(s) as barred if the base unit 110 did not provide some essential SIB(s) but may repeat the SI/SIB requests. Further, the base unit 110 may send only the updated system information, i.e. information elements which are different from the previous values, to reduce the signaling overhead.

For UE demanded SIBS (e.g. use-case specific system information), the remote unit 105 requests for a specific SIB(s) and the base unit 110 provides the requested SIB(s) via dedicated signaling. Alternatively, the remote unit 105 may indicate which SIB(s) it needs to (re)-acquire via higher layer signaling (e.g. RRC or MAC) and expects that during specific SIB acquisition (i.e. SI-window corresponding to the specific SIB) the base unit 110 will transmit scheduling information for DL and/or uplink (UL) channels in the initial active (or default) DL BWP.

For a SCell, the remote unit 105 may not be configured with the C-SS for any of configured DL BWP(s) of the SCell. In one example, the base unit 110 provides the remote unit 105 with the required SI initially and the updated SI later by dedicated signaling. In another example, an RRC procedure for the remote unit 105 which removes and adds back the SCell along with the updated SI or which reconfigures one or more DL BWP(s) along with the updated SI is used to update the SI.

FIG. 9 depicts one example of a paging-SearchSpace information element 900, according to embodiments of the disclosure. A remote unit 105, such as the UE 205, uses the information element 900 to determine PDCCH monitoring symbols/slots, e.g., to receive a paging message. In 3GPP NR, a paging occasion is defined as a number of slots where the UE 205 has to monitor the PDCCH carrying paging DCI. The UE 205 may compute its own paging frame and paging occasion within the paging frame based on its UE identity and a discontinuous reception (DRX) cycle length.

A control resource set (CORESET) configuration for paging DCI can be the same as the CORESET configuration for PDCCH carrying RMSI scheduling information, while PDCCH monitoring symbols/slots can be different and separately configured with the higher layer parameter 'paging-SearchSpace.' Note that the CORESET configuration may include at least one of: subcarrier spacing, a CP length, a number of consecutive resource blocks, a number of consecutive symbols, resource element group (REG) bundle size, and control channel element (CCE) to REG mapping type.

The UE 205 determines a number of consecutive resource blocks and a number of consecutive symbols for the control resource set of Type0-PDCCH common search space (for a DCI format with cyclic redundancy code (CRC) scrambled by a SI-RNTI on a primary cell) from the first four bits of RMSI-PDCCH-Config and determines PDCCH monitoring occasions from the second four bits of RMSI-PDCCH-Config. The allowed PDCCH configurations for PDCCH carrying RMSI scheduling information include the following three different multiplexing types for a SS/PBCH block and a corresponding CORESET (i.e. the CORESET which is spatially quasi-co-located with the SS/PBCH block): Type 1, Type 2, and Type 3.

For Type 1, the SS/PBCH block and the corresponding RMSI CORESET occur in different time instances, and a SS/PBCH block transmit bandwidth and the initial active DL BWP containing RMSI CORESET overlap.

For Type 2, the SS/PBCH block and the RMSI CORESET occur in different time instances, and the SS/PBCH block transmit bandwidth and the initial active DL BWP containing RMSI CORESET do not overlap.

For Type 3, the SS/PBCH block and the RMSI CORESET occur in the same time instance, and the SS/PBCH block transmit bandwidth and the initial active DL BWP containing RMSI CORESET do not overlap.

The configuration framework of RMSI CORESET monitoring occasions defined for Type 1 multiplexing can be easily extended to define multiple sets of CORESET monitoring occasions for all RMSI/paging CORESETs defined for Type 1/2/3 multiplexing, wherein each set of CORESET monitoring occasions corresponds to one paging occasion. In one example, at least one paging occasion may be the same as RMSI monitoring occasions.

In various embodiments, the information element 900 may have the following components: pagingOccasionList, pagingFrameDuration, and PagingOccasion. The pagingOccasionList is a list of one or more paging occasion configurations. In one embodiment, the number of paging occasions per paging frame is determined by the number of paging occasion configurations. In certain embodiments, the first paging occasion is always same as RMSI monitoring occasions (i.e., Type0-PDCCH common search space) and the configuration for the first paging occasion is not explicitly signaled. The pagingFrameDuration indicates the length of a paging frame. In one embodiment, the value of paging-FrameDuration indicates 1 radio frame. In another embodiment, the value of pagingFrameDuration indicates 2 radio frames.

The PagingOccasion parameter may include a plurality of components. The parameter groupOffset (O) is based on the subcarrier spacing of the SS/PBCH block. In the depicted embodiment, the groupOffset is selected from possible values {0, 2, 5, 7} when subcarrier spacing of SS/PBCH block is 15 kHz or 30 kHz and is selected from possible values {0, 2.5, 5, 7.5} when subcarrier spacing of SS/PBCH is 120 kHz or 240 kHz. The parameter nrofSearchSpaceSetsPerSlot (N) indicates the number of search space sets and, in the depicted embodiment, is selected from possible values {1, 2}. The parameter slotIncrementStep (M) indicates an incremental step size and, in the depicted embodiment, is selected from possible values {½, 1, 2}. The parameter startOFDM-symbol indicates a starting symbol of the paging occasion and, in the depicted embodiment, is selected from possible values {0, 1, 2, 3, . . . , 12, 13}. The parameter slotOffset (K) indicates a slot offset and, in the depicted embodiment, is selected from possible values {0, 1}.

Referring to FIGS. 3 and 4, for SS/PBCH block with index i and a given 'PagingOccasion' configuration, a UE 205 can determine an index of the paging occasion slot $n_0$ in a paging frame using equation 1, below:

$$n_0 = (O \cdot 2^\mu + \lfloor i \cdot M \rfloor + K) \bmod N_{slot}^{paging\ frame, \mu}, \quad \text{Equation 1}$$

Here O is a group offset, M is a slot increment step, K is a slot offset, as defined above, $\mu$ is subcarrier spacing (in kHz) of paging PDCCH normalized by 15 kHz, and $N_{slot}^{paging\ frame, \mu}$ is the number of slots per paging frame in the paging PDCCH subcarrier spacing, $\mu$.

In certain embodiments, one or more of the paging occasion parameters, such as the slotIncrementStep (M), slotOffset (K), and/or the paging search-space set in the paging occasion slot $n_0$, may be dependent on the UE-ID.

Figure 10:
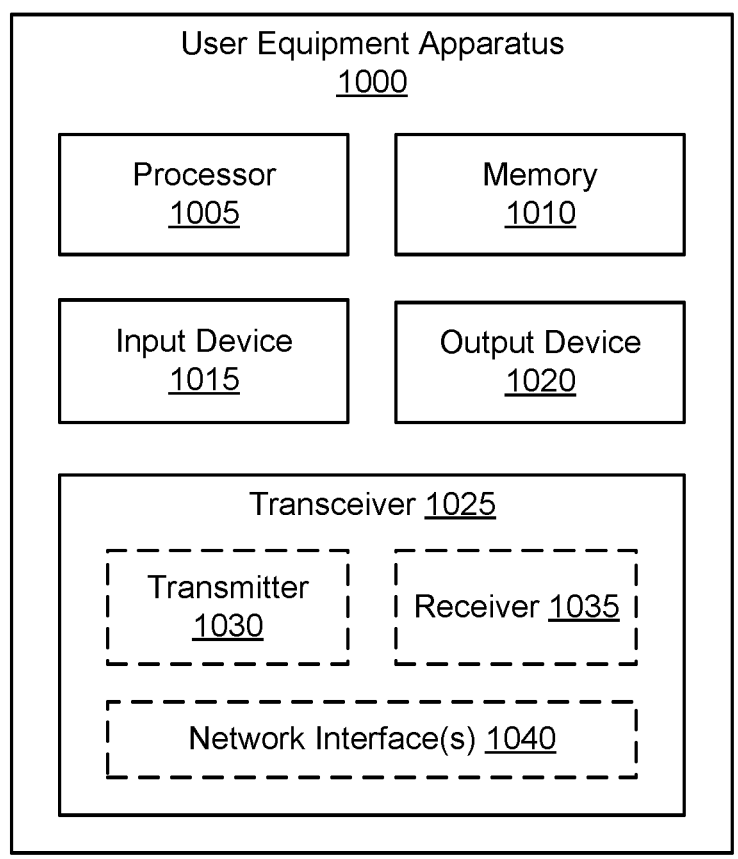
FIG. 10 is a schematic block diagram illustrating one embodiment of a user equipment apparatus for SI delivery and receiving a paging message.

FIG. 10 depicts one embodiment of a user equipment apparatus 1000 that may be used for SI delivery and for receiving a paging message, according to embodiments of the disclosure. The user equipment apparatus 1000 may be one embodiment of the remote unit 105 and/or the UE 205, described above. Furthermore, the user equipment apparatus 1000 may include a processor 1005, a memory 1010, an input device 1015, an output device 1020, a transceiver 1025 for communicating with one or more base units 110.

As depicted, the transceiver 1025 may include a transmitter 1030 and a receiver 1035. The transceiver 1025 may also support one or more network interfaces 1040, such as the Uu interface used to communicate with a gNB. In some embodiments, the input device 1015 and the output device 1020 are combined into a single device, such as a touchscreen. In certain embodiments, the user equipment apparatus 1000 may not include any input device 1015 and/or output device 1020.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the processor 1005 controls the user equipment apparatus 1000 to implement the above described UE behaviors. In certain embodiments, the processor 1005 may include an application processor (also known as "main processor") which manages application-domain and operating system ("OS") functions and a baseband processor (also known as "baseband radio processor") which manages radio functions.

In some embodiments, the processor 1005 acquires at least one system information block for a first cell in an initial active DL BWP. Moreover, the processor 1005 controls the transceiver 1025 to establish an RRC connection with the first cell based on the acquired at least one system information block. The transceiver 1025 receives a configuration including at least one DL BWP of the first cell via higher layer signaling and further receives an indication of a first DL BWP selected from the configured at least one BWP of the first cell as an active DL BWP. Moreover, the processor 1005 controls the transceiver to transmit via higher layer signaling an indication of one or more SIBs necessary for UE operation to a network entity, wherein the first DL BWP is different from the initial active DL BWP.

In certain embodiments, the first cell is a primary cell of a primary cell group or a primary secondary cell of a secondary cell group. In some embodiments, the at least one system information block is acquired from at least one of broadcast signaling and an on-demand SI request procedure. In one embodiment, the indication of the one or more SIB s necessary for UE operation is transmitted via at least one of an RRC message and a MAC bitmap.

In some embodiments, the transceiver 1025 receives a C-SS configuration of the first DL BWP. In such embodiments, the transceiver 1025 receives an indication of at least one DL gap pattern of the first DL BWP and receives a paging message indicating system information modification, wherein the paging message indicating system information modification is included in a PDCCH of the configured C-SS. Moreover, the processor 1005 selects a DL gap pattern from the indicated at least one DL gap pattern of the first DL BWP based on the one or more SIBS necessary for UE operation and re-tunes to the initial active DL BWP based on the selected DL gap pattern of the first DL BWP to re-acquire updated system information of the first cell in the initial active DL BWP. Here, the user equipment apparatus is expected to receive a DL signal/channel not in the first DL BWP but in the initial active DL BWP during a DL gap of the selected DL gap pattern of the first DL BWP.

Additionally, when receiving a C-SS configuration of the first DL BWP, the processor 1005 may decode a PDCCH in the configured C-SS of the first DL BWP, wherein a CRC of the decoded PDCCH is scrambled by SI-RNTI and identify at least one slot, where at least one PDSCH carrying the one or more SIBs necessary for UE operation is transmitted by the network entity on a second DL BWP, based on the decoded PDCCH. The processor 1005 further re-tunes to the second DL BWP, and re-acquiring updated system information of the first cell in the second DL BWP on the identified at least one slot, wherein the second DL BWP is different from the first DL BWP and the UE is expected to receive a DL signal/channel not in the first DL BWP but in the second DL BWP on the identified at least one slot.

In further embodiments, the transceiver 1025 may receive a paging message indicating system information modification in the configured C-SS of the first DL BWP, before the processor 1005 attempts to decode in the configured C-SS of the first DL BWP the PDCCH whose CRC is scrambled by SI-RNTI. In one embodiment, the second DL BWP is same as the initial active DL BWP. In another embodiment, the second DL BWP is different from the initial active DL BWP.

In some embodiments, the transceiver 1025 may receive updated system information via dedicated signaling in the first DL BWP. In one embodiment, the processor 1005 controls the transceiver 1025 to maintain the RRC connection with the first cell when the updated system information corresponding to one or more essential SIB(s) is not provided by the network entity (e.g., a RAN node 210, such as a gNB) and send a request for the updated system information. In certain embodiments, the updated system information includes one or more information elements, wherein values of the one or more information elements are different from the previous values.

In various embodiments, the transceiver 1025 may receive a configuration for a first DL gap pattern and a second DL gap pattern, wherein the processor 1005 re-tunes to a second DL BWP based on the first DL gap pattern and determining in the second DL BWP whether system information will be or has been modified or not, and re-tunes to a third DL BWP based on the second DL gap pattern and receiving updated system information in the third DL BWP, if it is determined that the system information will be or has been modified. Here, a C-SS of the first DL BWP is not configured, the second and third DL BWP(s) are different from the first DL BWP, and the user equipment apparatus 1000 is expected to receive a DL signal/channel not in the first DL BWP, but in the second DL BWP during a DL gap of the first DL gap pattern and in the third DL BWP during a DL gap of the second DL gap pattern.

In one such embodiment, the first DL gap pattern may be used for receiving a paging message indicating SI modification in the second DL BWP. In another such embodiment, the first DL gap pattern may be used for receiving a SystemInformationBlockType1 (SIB1) in the second DL BWP, wherein systemInfoValueTag in the SIB1 is used to determine whether to update stored system information or not. In one embodiment, the second DL BWP is same as the third DL BWP. In another embodiment, the second DL gap pattern is based on the one or more SIBS necessary for UE operation.

In certain embodiments, the transceiver 1025 receives one or more paging occasion configurations in a system information block and the processor 1005 determines at least one paging frame and at least one paging occasion identity within the at least one paging frame based on at least one of a UE identity and a discontinuous reception (DRX) cycle length. Moreover, the processor 1005 may select at least one paging occasion configuration from the received one or more paging occasion configurations (the selected at least one paging occasion configuration being associated with the determined at least one paging occasion identity) and determine at least one paging slot and at least one paging symbol within the determined at least one paging slot based on the selected at least one paging occasion configuration. Further, the processor 1005 attempts to decode a PDCCH carrying paging DCI on the determined at least one paging symbol within the determined at least one paging slot of the determined at least one paging frame.

In one embodiment, each of the received one or more paging occasion configurations is associated with a paging occasion identity. In certain embodiments, determining the at least one paging frame is to determine a starting radio frame index of the at least one paging frame. In some embodiments, the transceiver 1025 further receives an indication of a paging frame duration. In one embodiment, the paging frame duration is longer than one radio frame duration.

In certain embodiments, the determined paging slot is in a paging occasion, wherein the paging occasion is determined based on the paging occasion configuration selected from the one or more paging occasion configurations and contains a plurality of paging slots. In some embodiments, the processor 1005 selects a synchronization signal/physical broadcast channel block ("SS/PBCH block") from a plurality of SS/PBCH blocks, wherein the determined paging slot and the paging symbol within the determined paging slot are dependent on the selected SS/PBCH block.

In some embodiments, each of the one or more paging occasion configurations includes information used for determining a plurality of paging slots. In one embodiment, the information used for determining the plurality of paging slots includes information related to a starting paging slot of the plurality of paging slots. In another embodiment, the information used for determining the plurality of paging slots includes information related to a slot increment step of the plurality of paging slots. In certain embodiments, each of the one or more paging occasion configurations includes information related to a paging search space within a paging slot, wherein the paging symbol is determined based on the paging search space.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data relating to SI delivery in a wideband carrier. For example, the memory 1010 may store scheduling data, uplink data, logical channel mappings, and the like. In some embodiments, the memory 1010 also stores program code and related data, such as an operating system or other controller algorithms operating on the remote unit 105 and one or more software applications.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes two or more different devices, such as a keyboard and a touch panel. In certain embodiments, the input device 1015 may include a camera for capturing images or otherwise inputting visual data.

The output device 1020, in one embodiment, may include any known electronically controllable display or display device. The output device 1020 may be designed to output visual, audible, and/or haptic signals. In some embodiments, the output device 1020 includes an electronic display capable of outputting visual data to a user. For example, the output device 1020 may include, but is not limited to, an LCD display, an LED display, an OLED display, a projector, or similar display device capable of outputting images, text, or the like to a user.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein. Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
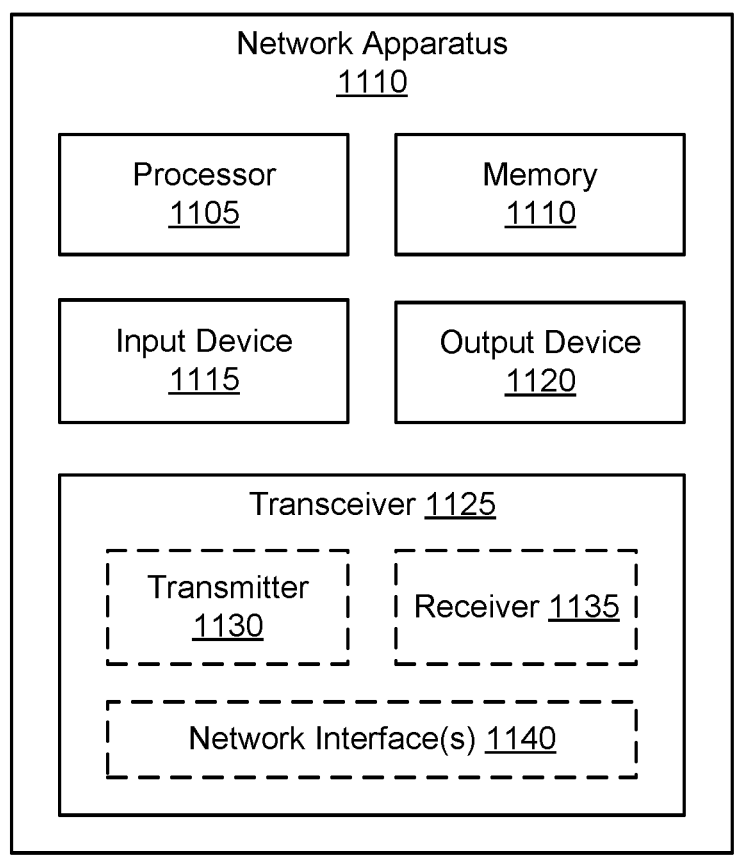
FIG. 11 is a schematic block diagram illustrating one embodiment of a network apparatus for SI delivery and transmitting a paging message.

FIG. 11 depicts a network apparatus 1100 that may be used for power-efficient paging reception, according to embodiments of the disclosure. In one embodiment, network apparatus 1100 may be one implementation of a network node, such as the base unit 121 and/or the RAN node 210, as described above. Furthermore, the network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 115. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the network apparatus 1100 is a RAN node (e.g., gNB) that communicates with one or more UEs, as described herein. In such embodiments, the processor 1105 controls the network apparatus 1100 to perform the above described RAN behaviors. When operating as a RAN node, the processor 1105 may include an application processor (also known as "main processor") which manages application-domain and operating system ("OS") functions and a baseband processor (also known as "baseband radio processor") which manages radio functions.

In various embodiments, the processor 1105 controls the transceiver 1125 to transmit at least one paging occasion configuration in a system information block ("SIB"), wherein the SIB includes a first quantity of paging occasion configurations. The processor 1105 determines a paging frame and a paging occasion identity within the paging frame based on at least one of: a UE identity of a device to be paged and a discontinuous reception cycle length, wherein an amount of paging occasions per paging frame corresponds to the first quantity of paging occasion configurations included in the SIB.

The processor 1105 further selects a paging occasion configuration from the transmitted at least one paging occasion configuration. Here, the selected paging occasion configuration is associated with the determined paging occasion identity. Additionally, the transceiver 1125 transmits a physical downlink control channel ("PDCCH") carrying paging downlink control information ("DCI") on a particular paging symbol within a particular paging slot of the determines paging frame, and where the particular paging slot and the particular paging symbol within the particular paging slot are determined based on the selected paging occasion configuration.

In some embodiments, determining the paging frame includes determining a starting radio frame index of the paging frame. In some embodiments, the transceiver 1125 further transmits an indication of a paging frame duration. In certain embodiments, the paging frame duration is longer than one radio frame duration.

In some embodiments, the particular paging slot is in a paging occasion. In such embodiments, the paging occasion is determined based on the paging occasion configuration selected from the at least one paging occasion configuration and contains a plurality of paging slots. In some embodiments, each of the at least one paging occasion configuration includes information related to a paging search space within a paging slot. In such embodiments, the paging symbol may be determined based on the paging search space.

In some embodiments, the processor 1105 further selects a synchronization signal/physical broadcast channel block ("SS/PBCH block") from a plurality of SS/PBCH blocks. In such embodiments, the particular paging slot and the particular paging symbol within the particular paging slot are dependent on the selected SS/PBCH block.

In some embodiments, each of the transmitted at least one paging occasion configuration is associated with a paging occasion identity. In some embodiments, each of the at least one paging occasion configuration includes information usable by the device to determine a plurality of paging slots. In certain embodiments, the information usable by the device to determine the plurality of paging slots includes at least one of: information related to a starting paging slot of the plurality of paging slots, and information related to a slot increment step of the plurality of paging slots.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to power-efficient paging reception. For example, the memory 1110 may store parameters, configurations, resource assignments, policies, and the like, as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the PLMN and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

Figure 12:
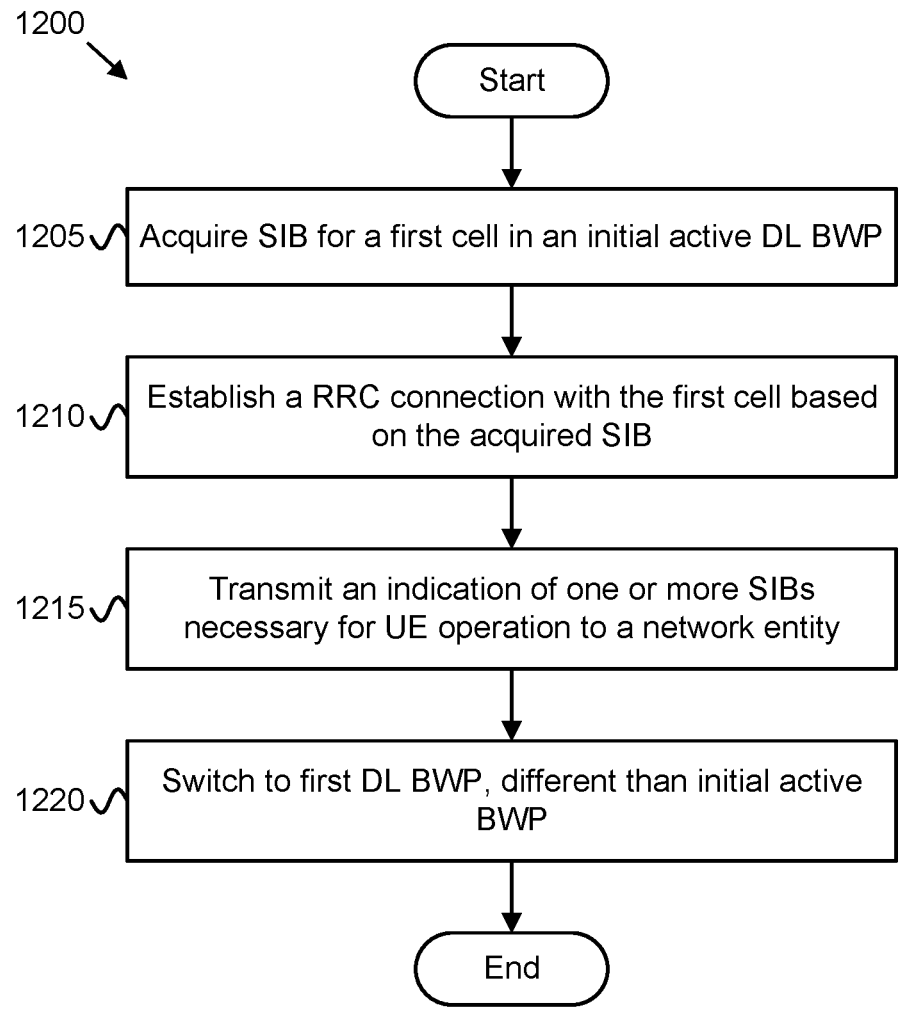
FIG. 12 is a flowchart diagram illustrating one embodiment of a method for SI delivery.

FIG. 12 is a schematic flow chart diagram illustrating one embodiment of a method 1200 for SI delivery in a wideband carrier, according to embodiments of the disclosure. In some embodiments, the method 1200 is performed by a remote unit, such as the remote unit 105, the UE 205, the first UE 255, the second UE 265, the third UE 275, and/or the user equipment apparatus 1000. In certain embodiments, the method 1200 may be performed by a processor executing program code, for example, a microcontroller, a microprocessor, a CPU, a GPU, an auxiliary processing unit, a FPGA, or the like.

The method 1200 begins and acquires 1205 a SIB for a first cell in an initial active DL BWP. The method 1200 includes establishing 1210 a RRC connection with the first cell based on the acquired at least one system information block. The method 1200 includes transmitting 1215 an indication of one or more SIBs necessary for UE operation to a network entity. The method 1200 includes switching 1220 to a first DL BWP, wherein the first DL BWP is different from the initial active DL BWP. The method 1200 ends.

Figure 13:
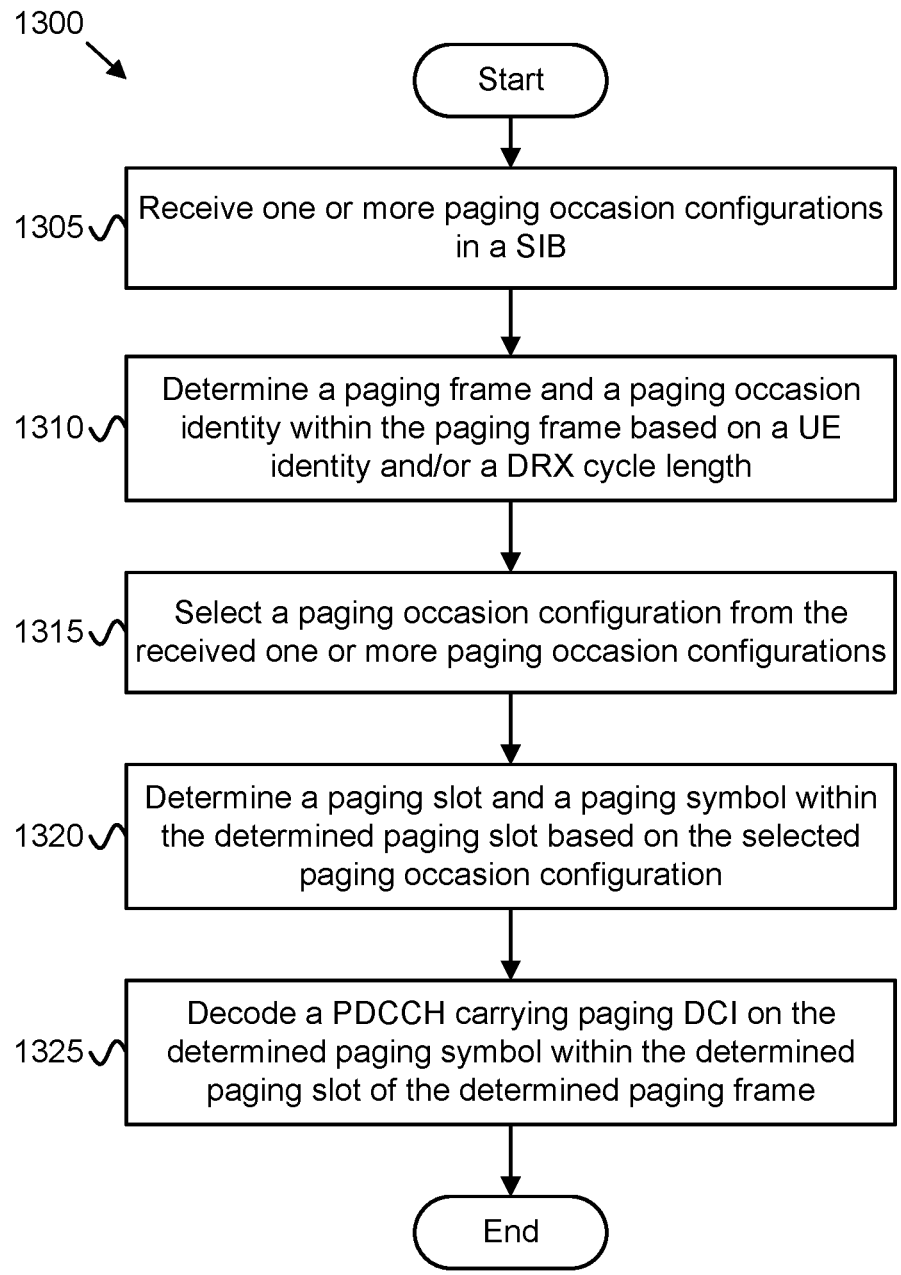
FIG. 13 is a flowchart diagram illustrating one embodiment of a method for receiving a paging message.

FIG. 13 is a schematic flow chart diagram illustrating one embodiment of a method 1300 for receiving a paging message, according to embodiments of the disclosure. In some embodiments, the method 1300 is performed by a remote unit, such as the remote unit 105, the UE 205, the first UE 255, the second UE 265, the third UE 275, and/or the user equipment apparatus 1000. In certain embodiments, the method 1300 may be performed by a processor executing program code, for example, a microcontroller, a microprocessor, a CPU, a GPU, an auxiliary processing unit, a FPGA, or the like.

The method 1300 begins and receives 1305 one or more paging occasion configurations in a system information block. The method 1300 includes determining 1310 a paging frame and a paging occasion identity within the paging frame based on at least one of: a UE identity and a discontinuous reception (DRX) cycle length. The method 1300 includes selecting 1315 a paging occasion configuration from the received one or more paging occasion configurations, wherein the selected paging occasion configuration is associated with the determined paging occasion identity. The method 1300 includes determining 1320 a paging slot and a paging symbol within the determined paging slot based on the selected paging occasion configuration. The method 1300 includes decoding 1325 a PDCCH carrying paging DCI on the determined paging symbol within the determined paging slot of the determined paging frame. The method 1300 ends.

Figure 14:
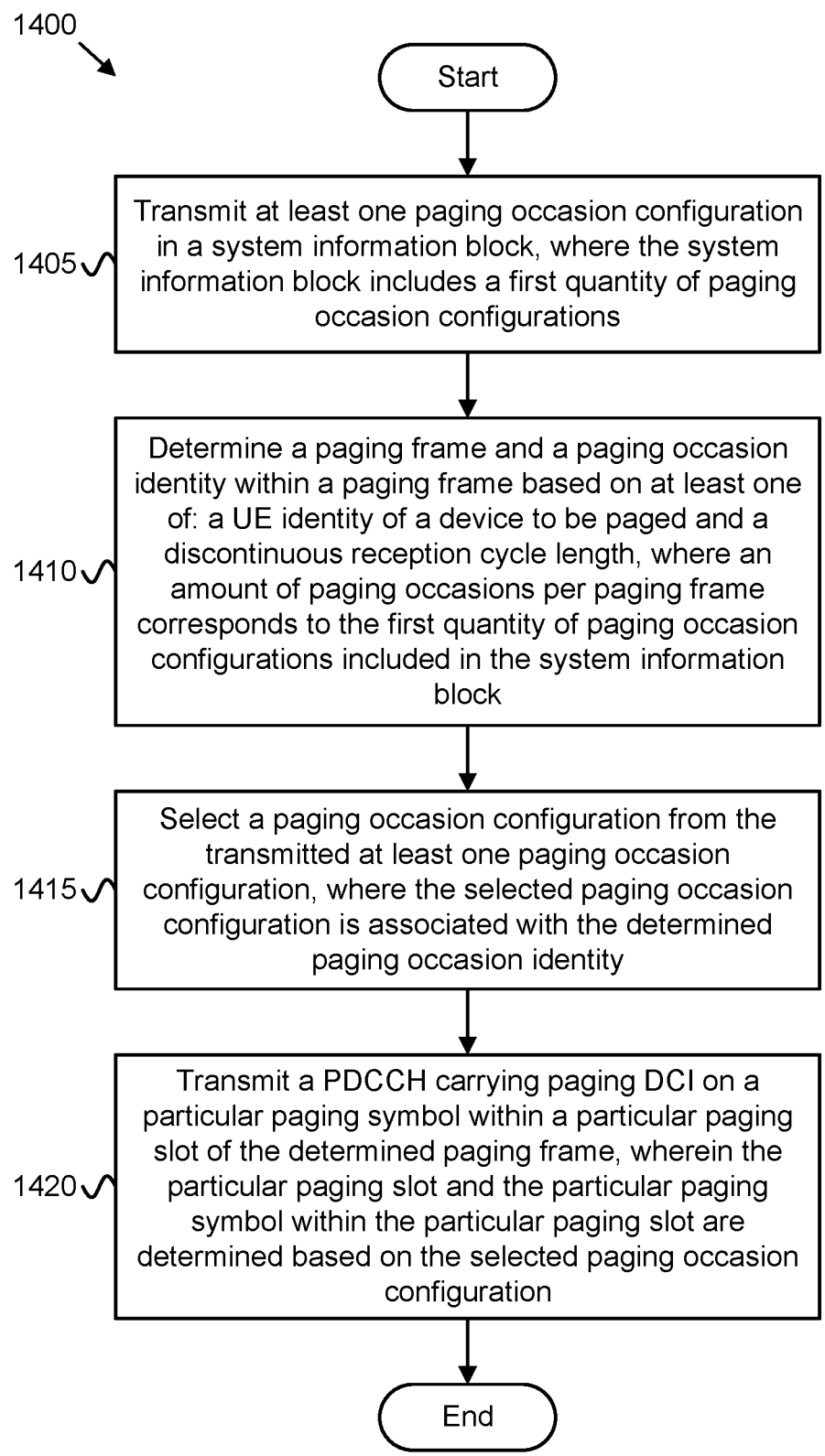
FIG. 14 is a flowchart diagram illustrating one embodiment of a method for transmitting a paging message.

FIG. 14 depicts one embodiment of a method 1400, according to embodiments of the disclosure. In various embodiments, the method 1400 is performed by a network node, such as the base unit 121, the RAN node 210, and/or the network apparatus 1100, described above. In some embodiments, the method 1400 is performed by a processor, such as a microcontroller, a microprocessor, a CPU, a GPU, an auxiliary processing unit, a FPGA, or the like.

The method 1400 begins and transmits 1405 at least one paging occasion configuration in a system information block, where the system information block includes a first quantity of paging occasion configurations. The method 1400 includes determining 1410 a paging frame and a paging occasion identity within a paging frame based on at least one of: a User Equipment ("UE") identity of a device to be paged and a discontinuous reception cycle length, where an amount of paging occasions per paging frame corresponds to the first quantity of paging occasion configurations included in the system information block.

The method 1400 includes selecting 1415 a paging occasion configuration from the transmitted at least one paging occasion configuration, where the selected paging occasion configuration is associated with the determined paging occasion identity. The method 1400 includes transmitting 1420 a physical downlink control channel ("PDCCH") carrying paging downlink control information ("DCI") on a particular paging symbol within a particular paging slot of the determined paging frame, where the particular paging slot and the particular paging symbol within the particular paging slot are determined based on the selected paging occasion configuration. The method 1400 ends.

Disclosed herein is a first apparatus for transmitting a paging message, according to embodiments of the disclosure. The first apparatus may be implemented by a network node, such as the base unit 121, the RAN node 210, and/or the network apparatus 1100, described above. The first apparatus includes a processing unit (e.g., a processor 1105) and a transceiver (e.g., a transceiver 1125) that transmits at least one paging occasion configuration in a system information block ("SIB"), wherein the SIB includes a first quantity of paging occasion configurations. The processing unit determines a paging frame and a paging occasion identity within the paging frame based on at least one of: a UE identity of a device to be paged and a discontinuous reception cycle length, wherein an amount of paging occasions per paging frame corresponds to the first quantity of paging occasion configurations included in the SIB.

The processing unit further selects a paging occasion configuration from the transmitted at least one paging occasion configuration. Here, the selected paging occasion configuration is associated with the determined paging occasion identity. Additionally, the transceiver transmits a PDCCH carrying paging DCI on a particular paging symbol within a particular paging slot of the determines paging frame, and where the particular paging slot and the particular paging symbol within the particular paging slot are determined based on the selected paging occasion configuration.

In some embodiments, determining the paging frame includes determining a starting radio frame index of the paging frame. In some embodiments, the transceiver further transmits an indication of a paging frame duration. In certain embodiments, the paging frame duration is longer than one radio frame duration.

In some embodiments, the particular paging slot is in a paging occasion. In such embodiments, the paging occasion is determined based on the paging occasion configuration selected from the at least one paging occasion configuration and contains a plurality of paging slots. In some embodiments, each of the at least one paging occasion configuration includes information related to a paging search space within a paging slot, wherein the paging symbol is determined based on the paging search space.

In some embodiments, the processing unit further selects a synchronization signal/physical broadcast channel block ("SS/PBCH block") from a plurality of SS/PBCH blocks. In such embodiments, the particular paging slot and the particular paging symbol within the particular paging slot are dependent on the selected SS/PBCH block.

In some embodiments, each of the transmitted at least one paging occasion configuration is associated with a paging occasion identity. In some embodiments, each of the at least one paging occasion configuration includes information usable by the device to determine a plurality of paging slots. In certain embodiments, the information usable by the device to determine the plurality of paging slots includes at least one of: information related to a starting paging slot of the plurality of paging slots, and information related to a slot increment step of the plurality of paging slots.

Disclosed herein is a first method for transmitting a paging message, according to embodiments of the disclosure. The first method may be performed by a network node, such as the base unit 121, the RAN node 210, and/or the network apparatus 1100, described above. The first method includes transmitting at least one paging occasion configuration in a system information block, wherein the system information block includes a first quantity of paging occasion configurations. The first method includes determining a paging frame and a paging occasion identity within a paging frame based on at least one of: a User Equipment ("UE") identity of a device to be paged and a discontinuous reception cycle length, wherein an amount of paging occasions per paging frame corresponds to the first quantity of paging occasion configurations included in the system information block. The first method includes selecting a paging occasion configuration from the transmitted at least one paging occasion configuration, wherein the selected paging occasion configuration is associated with the determined paging occasion identity. The first method includes transmitting a physical downlink control channel ("PDCCH") carrying paging downlink control information ("DCI") on a particular paging symbol within a particular paging slot of the determined paging frame, wherein the particular paging slot and the particular paging symbol within the particular paging slot are determined based on the selected paging occasion configuration.

In some embodiments, determining the paging frame includes determining a starting radio frame index of the paging frame. In some embodiments, the first method further includes transmitting an indication of a paging frame duration. In certain embodiments, the paging frame duration is longer than one radio frame duration.

In some embodiments, the particular paging slot is in a paging occasion. In such embodiments, the paging occasion is determined based on the paging occasion configuration selected from the at least one paging occasion configuration and contains a plurality of paging slots. In some embodiments, each of the at least one paging occasion configuration includes information related to a paging search space within a paging slot. In such embodiments, the particular paging symbol may be determined based on the paging search space.

In some embodiments, the first method further includes selecting a synchronization signal/physical broadcast channel block ("SS/PBCH block") from a plurality of SS/PBCH blocks. In such embodiments, the particular paging slot and the particular paging symbol within the particular paging slot are dependent on the selected SS/PBCH block.

In some embodiments, each of the transmitted at least one paging occasion configuration is associated with a paging occasion identity. In some embodiments, each of the at least one paging occasion configuration includes information usable by the device to determine a plurality of paging slots. In certain embodiments, the information usable by the device to determine the plurality of paging slots includes at least one of: information related to a starting paging slot of the plurality of paging slots, and information related to a slot increment step of the plurality of paging slots.

Disclosed herein is a second apparatus for system information delivery. The second apparatus may be a user terminal, such as the remote unit 105, the UE 205, the first UE 255, the second UE 265, the third UE 275, and/or the user equipment apparatus 1000. The second apparatus includes a processing unit (e.g., a processor 1005) that acquires a system information block ("SIB") for a first cell using an initial active downlink bandwidth part ("DL BWP") and establishes a radio resource control ("RRC") connection with the first cell based on the acquired SIB. The second apparatus includes a transceiver that transmits an indication of one or more SIBs necessary for remote unit operation to a network entity and switches to a first DL BWP, wherein the first DL BWP is different from the initial active DL BWP. Note that the processing unit may control the transceiver to acquire the SIB and establish the RRC connection. Here, the indication of the one or more SIB s necessary for remote unit operation may be transmitted via higher layer signaling.

In some embodiments, the first cell is one of: a primary cell of a primary cell group and a primary secondary cell of a secondary cell group. In certain embodiments, the SIB is acquired from at least one of: broadcast signaling and an on-demand system information ("SI") request procedure. In some embodiments, the indication of the one or more SIBs necessary for remote unit operation is transmitted via at least one of: an RRC message and a media access control ("MAC") bitmap.

In some embodiments, the processing unit receives (e.g., via the transceiver) a common search space ("C-SS") configuration of the first DL BWP and the transceiver receives a paging message indicating system information modification, wherein the paging message indicating system information modification is included in a physical downlink control channel ("PDCCH") of the configured C-SS. In such embodiments, the processing unit tunes to a second DL BWP different from the first DL BWP and acquires updated system information of the first cell in the second DL BWP.

In some such embodiments, the processing unit receives (e.g., via the transceiver) an indication of a DL gap pattern of the first DL BWP and selects a DL gap pattern from the indicated DL gap pattern of the first DL BWP. Here, the selection may be based on the one or more SIBS necessary for UE operation. Moreover, the second DL BWP may be the initial active DL BWP. Further, tuning to the second DL BWP and acquiring the updated system information occurs based on the selected DL gap pattern.

In other such embodiments, the processing unit decodes a PDCCH in the configured C-SS of the first DL BWP in response to receiving the paging message and identifying a slot for receiving SI based on the decoded PDCCH. Here, acquiring updated system information of the first cell in the second DL BWP may include receiving a physical downlink shared channel ("PDSCH") carrying the one or more SIBS necessary for remote unit operation on the identified slot. In certain embodiments, the second DL BWP is different from the initial active DL BWP.

In some embodiments, the processing unit receives (e.g., via the transceiver) a configuration for a first DL gap pattern and a second DL gap pattern, wherein no C-SS is configured for the first DL BWP and tuning to a second DL BWP based on the first DL gap pattern, the second DL BWP being different than the first DL BWP. Here, the processing unit receives in the second DL BWP (e.g., via the transceiver) an indication of whether SI is modified and receives (e.g. via the transceiver) updated SI based on the second DL gap pattern in response to the SI being modified.

In such embodiments, receiving updated SI may include the apparatus tuning to a third DL BWP based on the second DL gap pattern, wherein the third DL BWP is different than both the second DL BWP and the first DL BWP. In other embodiments, the second DL BWP is same as the third DL BWP. In certain embodiments, the first DL gap pattern is used for receiving a paging message indicating SI modification in the second DL BWP. In other embodiments, the first DL gap pattern is used for receiving a first SIB in the second DL BWP, wherein the first SIB includes the indication of whether SI is modified. In various embodiments, the second DL gap pattern is based on the one or more SIBs necessary for remote unit operation.

In still other embodiments, the processing unit receives (e.g., via the transceiver) updated SI via dedicated signaling in the first DL BWP. In such embodiments, the processing unit may control the transceiver to send a request for the updated SI in response to receiving an indication of updates SI and in response to one or more essential SIBs not being provided by the network entity. Here, the network entity sends the updated SI via dedicated signaling in the first DL BWP in response to the request for updated SI.

Disclosed herein is a second method for system information delivery. The second method may be performed by a user terminal, such as the remote unit 105, the UE 205, the first UE 255, the second UE 265, the third UE 275, and/or the user equipment apparatus 1000. The second method includes acquiring a system information block ("SIB") for a first cell using an initial active downlink bandwidth part ("DL BWP") and establishing a radio resource control ("RRC") connection with the first cell based on the acquired SIB. The second method includes transmitting an indication of one or more SIBS necessary for remote unit operation to a network entity and switching to a first DL BWP, wherein the first DL BWP is different from the initial active DL BWP. Here, the indication of the one or more SIBs necessary for remote unit operation may be transmitted via higher layer signaling.

In some embodiments, the first cell is one of: a primary cell of a primary cell group and a primary secondary cell of a secondary cell group. In certain embodiments, the SIB is acquired from at least one of: broadcast signaling and an on-demand system information ("SI") request procedure. In some embodiments, the indication of the one or more SIBs necessary for remote unit operation is transmitted via at least one of: an RRC message and a media access control ("MAC") bitmap.

In some embodiments, the second method further includes receiving a common search space ("C-SS") configuration of the first DL BWP, receiving a paging message indicating system information modification, wherein the paging message indicating system information modification is included in a physical downlink control channel ("PDCCH") of the configured C-SS, tuning to a second DL BWP, wherein the second DL BWP is different from the first DL BWP, and acquiring updated system information of the first cell in the second DL BWP.

In some such embodiments, the second method may include receiving an indication of a DL gap pattern of the first DL BWP and selecting a DL gap pattern from the indicated DL gap pattern of the first DL BWP based on the one or more SIBs necessary for UE operation. Here, the second DL BWP is the initial active DL BWP and tuning to the second DL BWP and acquiring the updated system information occurs based on the selected DL gap pattern.

In other such embodiments, the second method may include decoding a PDCCH in the configured C-SS of the first DL BWP in response to receiving the paging message and identifying a slot for receiving SI based on the decoded PDCCH. Here, acquiring updated system information of the first cell in the second DL BWP may include receiving a physical downlink shared channel ("PDSCH") carrying the one or more SIBs necessary for remote unit operation on the identified slot. In certain embodiments, the second DL BWP is different from the initial active DL BWP.

In some embodiments, the second method includes receiving a configuration for a first DL gap pattern and a second DL gap pattern, wherein no C-SS is configured for the first DL BWP and tuning to a second DL BWP based on the first DL gap pattern, the second DL BWP being different than the first DL BWP. Here, the second method further includes receiving, in the second DL BWP, an indication of whether SI is modified and receiving updated SI based on the second DL gap pattern in response to the SI being modified.

In such embodiments, receiving updated SI may include tuning to a third DL BWP based on the second DL gap pattern, wherein the third DL BWP is different than both the second DL BWP and the first DL BWP. In other embodiments, the second DL BWP is same as the third DL BWP. In certain embodiments, the first DL gap pattern is used for receiving a paging message indicating SI modification in the second DL BWP. In other embodiments, the first DL gap pattern is used for receiving a first SIB in the second DL BWP, wherein the first SIB includes the indication of whether SI is modified. In various embodiments, the second DL gap pattern is based on the one or more SIBS necessary for remote unit operation.

In still other embodiments, the second method includes receiving updated SI via dedicated signaling in the first DL BWP. In such embodiments, the second method may include sending a request for the updated SI in response to receiving an indication of updates SI and in response to one or more essential SIBs not being provided by the network entity.

Disclosed herein is a third apparatus for receiving a paging message. The third apparatus also may be a user terminal, such as the remote unit 105, the UE 205, the first UE 255, the second UE 265, the third UE 275, and/or the user equipment apparatus 1000. The third apparatus includes a processing unit (e.g., a processor 1005) and a transceiver (e.g., transceiver 1025) that receives one or more paging occasion configurations in a system information block. The processing unit determines a paging frame and a paging occasion identity within the paging frame based on at least one of: a UE identity and a discontinuous reception cycle length and selects a paging occasion configuration from the received one or more paging occasion configurations, wherein the selected paging occasion configuration is associated with the determined paging occasion identity. Moreover, the processing unit determines a paging slot and a paging symbol within the determined paging slot based on the selected paging occasion configuration and decodes a physical downlink control channel ("PDCCH") carrying paging downlink control information ("DCI") on the determined paging symbol within the determined paging slot of the determined paging frame.

In certain embodiments, each of the received one or more paging occasion configurations is associated with a paging occasion identity. In some embodiments, determining the paging frame includes determining a starting radio frame index of the paging frame. In certain embodiments, the transceiver further receives an indication of a paging frame duration. In various embodiments, the paging frame duration is longer than one radio frame duration.

In certain embodiments, the determined paging slot is in a paging occasion, wherein the paging occasion is determined based on the paging occasion configuration selected from the one or more paging occasion configurations and contains a plurality of paging slots. In some embodiments, the processing unit further selects a synchronization signal/physical broadcast channel block ("SS/PBCH block") from a plurality of SS/PBCH blocks, wherein the determined paging slot and the paging symbol within the determined paging slot are dependent on the selected SS/PBCH block.

In some embodiments, each of the one or more paging occasion configurations includes information used for determining a plurality of paging slots. In one embodiment, the information used for determining the plurality of paging slots includes information related to a starting paging slot of the plurality of paging slots. In another embodiment, the information used for determining the plurality of paging slots includes information related to a slot increment step of the plurality of paging slots. In certain embodiments, each of the one or more paging occasion configurations includes information related to a paging search space within a paging slot, wherein the paging symbol is determined based on the paging search space.

Disclosed herein is a third method for receiving a paging message. The third method may be performed by a user terminal, such as the remote unit 105, the UE 205, the first UE 255, the second UE 265, the third UE 275, and/or the user equipment apparatus 1000. The third method includes receiving one or more paging occasion configurations in a system information block and determining a paging frame and a paging occasion identity within the paging frame based on one or more of: a UE identity and a discontinuous reception cycle length. The third method includes selecting a paging occasion configuration from the received one or more paging occasion configurations and determining a paging slot and a paging symbol within the determined paging slot based on the selected paging occasion configuration, wherein the selected paging occasion configuration is associated with the determined paging occasion identity. The third method also includes decoding a physical downlink control channel ("PDCCH") carrying paging downlink control information ("DCI") on the determined paging symbol within the determined paging slot of the determined paging frame.

In some embodiments, each of the received one or more paging occasion configurations is associated with a paging occasion identity. In certain embodiments, determining the paging frame includes determining a starting radio frame index of the paging frame. In some embodiments, the third method further includes receiving an indication of a paging frame duration. In certain embodiments, the paging frame duration is longer than one radio frame duration.

In certain embodiments, the determined paging slot is in a paging occasion, wherein the paging occasion is determined based on the paging occasion configuration selected from the one or more paging occasion configurations and contains a plurality of paging slots. In some embodiments, the third method further includes selecting a synchronization signal/physical broadcast channel block ("SS/PBCH block") from a plurality of SS/PBCH blocks, wherein the determined paging slot and the paging symbol within the determined paging slot are dependent on the selected SS/PBCH block.

In some embodiments, each of the one or more paging occasion configurations includes information used for determining a plurality of paging slots. In one embodiment, the information used for determining the plurality of paging slots includes information related to a starting paging slot of the plurality of paging slots. In another embodiment, the information used for determining the plurality of paging slots includes information related to a slot increment step of the plurality of paging slots. In certain embodiments, each of the one or more paging occasion configurations includes information related to a paging search space within a paging slot, wherein the paging symbol is determined based on the paging search space.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network node, the method comprising: transmitting at least one paging occasion configuration in a system information block, wherein the system information block includes a first quantity of paging occasion configurations; determining a paging frame and a paging occasion identity within a paging frame based on at least one of: a User Equipment ("UE") identity of a device to be paged or a discontinuous reception cycle length, wherein an amount of paging occasions per paging frame corresponds to the first quantity of paging occasion configurations included in the system information block; selecting a paging occasion configuration from the transmitted at least one paging occasion configuration, wherein the selected paging occasion configuration is associated with the determined paging occasion identity; and transmitting a physical downlink control channel ("PDCCH") carrying paging downlink control information ("DCT") on a particular paging symbol within a particular paging slot of the determined paging frame, wherein the particular paging slot and the particular paging symbol within the particular paging slot are determined based on the selected paging occasion configuration.

2. The method of claim 1, wherein each of the transmitted at least one paging occasion configuration is associated with a paging occasion identity.

3. The method of claim 1, wherein determining the paging frame comprises determining a starting radio frame index of the paging frame.

4. The method of claim 1, further comprising transmitting an indication of a paging frame duration.

5. The method of claim 4, wherein the paging frame duration is longer than one radio frame duration.

6. The method of claim 1, wherein the particular paging slot is in a paging occasion, wherein the paging occasion is determined based on the paging occasion configuration selected from the at least one paging occasion configuration and comprises a plurality of paging slots.

7. The method of claim 1, further comprising selecting a synchronization signal/physical broadcast channel block ("SS/PBCH block") from a plurality of SS/PBCH blocks, wherein the particular paging slot and the particular paging symbol within the particular paging slot are dependent on the selected SS/PBCH block.

8. The method of claim 1, wherein each of the at least one paging occasion configuration includes information usable by the device to determine a plurality of paging slots.

9. The method of claim 8, wherein the information usable by the device to determine the plurality of paging slots includes information related to a starting paging slot of the plurality of paging slots, information related to a slot increment step of the plurality of paging slots, or a combination thereof.

10. The method of claim 1, wherein each of the at least one paging occasion configuration includes information related to a paging search space within a paging slot, wherein the particular paging symbol is further determined based on the paging search space.

11. A network apparatus comprising: a
processor coupled to a memory, the processor configured to cause the apparatus to:
transmit at least one paging occasion configuration in a system information block, wherein the system in formation block includes a first quantity of paging occasion configurations;
determine a paging frame and a paging occasion identity within the paging frame based on at least one of: a User Equipment ("UE") identity of a device to be paged or a discontinuous reception cycle length, wherein an amount of paging occasions per paging frame corresponds to the first quantity of paging occasion configurations included in the system information block; and select a paging occasion configuration from the transmitted at least one paging occasion configuration, wherein the selected paging occasion configuration is associated with the determined paging occasion identity; and, transmit wherein a physical downlink control channel ("PDCCH") carrying paging downlink control information ("DCT") on a particular paging symbol within a particular paging slot of the determines paging frame, wherein the particular paging slot and the particular paging symbol within the particular paging slot are determined based on the selected paging occasion configuration.

12. The apparatus of claim 11, wherein each of the transmitted at least one paging occasion configuration is associated with a paging occasion identity.

13. The apparatus of claim 11, wherein to determine determining the paging frame, the processor is configured to cause the apparatus to determine a starting radio frame index of the paging frame.

14. The apparatus of claim 11, wherein the processor is configured to cause the apparatus to transmit an indication of a paging frame duration.

15. The apparatus of claim 14, wherein the paging frame duration is longer than one radio frame duration.

16. The apparatus of claim 11, wherein the particular paging slot is in a paging occasion, wherein the paging occasion is determined based on the paging occasion configuration selected from the at least one paging occasion configuration and comprises a plurality of paging slots.

17. The apparatus of claim 11, wherein the processor is configured to cause the apparatus to select a synchronization signal/physical broadcast channel block ("SS/PBCH block") from a plurality of SS/PBCH blocks, wherein the particular paging slot and the particular paging symbol within the particular paging slot are dependent on the selected SS/PBCH block.

18. The apparatus of claim 11, wherein each of the at least one paging occasion configuration includes information usable by the device to determine a plurality of paging slots.

19. The apparatus of claim 18, wherein the information usable by the device to determine the plurality of paging slots includes information related to a starting paging slot of the plurality of paging slots, information related to a slot increment step of the plurality of paging slots, or a combination thereof.

20. The apparatus of claim 11, wherein each of the at least one paging occasion configuration includes information related to a paging search space within a paging slot, wherein the paging symbol is determined based on the paging search space.

* * * * *